US012756928B1

(12) United States Patent
Jennings et al.

(10) Patent No.: US 12,756,928 B1
(45) Date of Patent: Oct. 6, 2026

(54) TRANSLATION OF CAMERA OPERATIONS USING A MANAGEMENT SERVER SYSTEM

(71) Applicant: Samsara Inc., San Francisco, CA (US)

(72) Inventors: William Jennings, Brookhaven, GA (US); Vignesh Bhuvaneshwar Iyer, Los Altos, CA (US); John Charles Bicket, San Francisco, CA (US); Karthikram Rajadurai, San Leandro, CA (US); Adam Eric Funkenbusch, Minneapolis, MN (US); Joyce Tian Chen, San Francisco, CA (US); Rhea Lin, New York, NY (US); Jason Symons, Dublin, CA (US); Matthew Geddie, New York, NY (US)

(73) Assignee: Samsara Inc., San Francisco, CA (US)

( * ) Notice: Subject to any disclaimer, the term of this patent is extended or adjusted under 35 U.S.C. 154(b) by 311 days.

(21) Appl. No.: 18/496,526

(22) Filed: Oct. 27, 2023

Related U.S. Application Data

(60) Provisional application No. 63/381,899, filed on Nov. 1, 2022.

(51) Int. Cl.
*H04N 23/661* (2023.01)
*H04N 7/18* (2006.01)
(Continued)

(52) U.S. Cl.
CPC ............. *H04N 23/661* (2023.01); *H04N 7/18* (2013.01); *H04N 23/617* (2023.01); *H04N 23/62* (2023.01)

(58) Field of Classification Search
CPC ..... H04N 23/661; H04N 23/617; H04N 23/62
See application file for complete search history.

(56) References Cited

U.S. PATENT DOCUMENTS 5,917,433 A 6/1999 Keillor et al.
6,157,864 A 12/2000 Schwenke et al.
(Continued)

FOREIGN PATENT DOCUMENTS

WO WO 2019/099409 A1 5/2019
WO WO 2019/125545 A1 6/2019
(Continued)

OTHER PUBLICATIONS

Malamas, Elias N. et al. "A survey on industrial vision systems, applications and tools", Sep. 17, 2002, Image and Vision Computing 21, pp. 171-188.

*Primary Examiner* — Boubacar Abdou Tchoussou
(74) *Attorney, Agent, or Firm* — Knobbe, Martens, Olson & Bear, LLP

(57) ABSTRACT

A management server system may obtain input identifying a camera from a plurality of cameras and an operation to be performed by the camera. The management server system may identify a camera type of the camera. Using a translation table, the management server system may identify a manner of translating the operation for the camera. The translation table may link a manner of translating for each operation of a plurality of operations to each camera of a plurality of cameras. Based on the manner of translating the operation, the management server system can generate a translated operation. The translated operation may be generated according to a protocol of the camera. The management server system may provide the translated operation to the camera to cause performance of an action.

20 Claims, 13 Drawing Sheets

(51) Int. Cl.
*H04N 23/617* (2023.01)
*H04N 23/62* (2023.01)

(56) References Cited

U.S. PATENT DOCUMENTS

| | | | |
|---|---|---|---|
| 6,452,487 | B1 | 9/2002 | Krupinski |
| 6,801,920 | B1 | 10/2004 | Wischinski |
| 7,596,417 | B2 | 9/2009 | Fister et al. |
| 7,957,936 | B2 | 6/2011 | Eryurek et al. |
| 8,024,311 | B2 | 9/2011 | Wood et al. |
| 8,633,672 | B2 | 1/2014 | Jung et al. |
| 9,024,744 | B2 | 5/2015 | Klose et al. |
| 9,100,674 | B2 * | 8/2015 | Kim .................. H04N 21/2335 |
| 9,230,250 | B1 | 1/2016 | Parker et al. |
| 9,445,270 | B1 | 9/2016 | Bicket et al. |
| 9,477,639 | B2 | 10/2016 | Fischer et al. |
| 9,973,638 | B2 * | 5/2018 | Pring ...................... H04L 69/08 |
| 10,033,706 | B2 | 7/2018 | Bicket et al. |
| 10,085,149 | B2 | 9/2018 | Bicket et al. |
| 10,102,495 | B1 | 10/2018 | Zhang et al. |
| 10,173,486 | B1 | 1/2019 | Lee et al. |
| 10,173,544 | B2 | 1/2019 | Hendrix et al. |
| 10,196,071 | B1 | 2/2019 | Rowson et al. |
| 10,206,107 | B2 | 2/2019 | Bicket et al. |
| 10,388,075 | B2 | 8/2019 | Schmirler et al. |
| 10,390,227 | B2 | 8/2019 | Bicket et al. |
| 10,444,949 | B2 | 10/2019 | Scott et al. |
| 10,579,123 | B2 | 3/2020 | Tuan et al. |
| 10,609,114 | B1 | 3/2020 | Bicket et al. |
| 10,623,899 | B2 | 4/2020 | Watkins et al. |
| 10,827,324 | B1 | 11/2020 | Hajimiri et al. |
| 10,843,659 | B1 | 11/2020 | Innocenzi et al. |
| 10,969,852 | B2 | 4/2021 | Tuan et al. |
| 10,979,871 | B2 | 4/2021 | Hajimiri et al. |
| 10,999,269 | B2 | 5/2021 | Bicket et al. |
| 10,999,374 | B2 | 5/2021 | ElHattab et al. |
| 11,046,205 | B1 | 6/2021 | Govan et al. |
| 11,080,568 | B2 | 8/2021 | ElHattab et al. |
| 11,122,488 | B1 | 9/2021 | Lloyd et al. |
| 11,126,910 | B1 | 9/2021 | Akhtar et al. |
| 11,127,130 | B1 | 9/2021 | Jain et al. |
| 11,131,986 | B1 | 9/2021 | Gal et al. |
| 11,132,853 | B1 | 9/2021 | Akhtar et al. |
| 11,137,744 | B1 | 10/2021 | Heddleston et al. |
| 11,158,177 | B1 | 10/2021 | ElHattab et al. |
| 11,184,422 | B1 | 11/2021 | Bicket et al. |
| 11,188,046 | B1 | 11/2021 | ElHattab et al. |
| 11,190,373 | B1 | 11/2021 | Stevenson et al. |
| 11,204,637 | B2 | 12/2021 | Tuan et al. |
| 11,341,786 | B1 | 5/2022 | Calmer et al. |
| 11,349,901 | B1 | 5/2022 | Duffield et al. |
| 11,352,013 | B1 | 6/2022 | Srinivasan et al. |
| 11,352,014 | B1 | 6/2022 | Srinivasan et al. |
| 11,356,605 | B1 | 6/2022 | Shemet et al. |
| 11,356,909 | B1 | 6/2022 | Lloyd |
| 11,365,980 | B1 | 6/2022 | Akhtar et al. |
| 11,386,325 | B1 | 7/2022 | Srinivasan et al. |
| 11,451,610 | B1 | 9/2022 | Saunders et al. |
| 11,451,611 | B1 | 9/2022 | Saunders et al. |
| 11,460,507 | B2 | 10/2022 | Lloyd et al. |
| 11,464,079 | B1 | 10/2022 | Aschenbener et al. |
| 11,479,142 | B1 | 10/2022 | Govan et al. |
| 11,494,921 | B2 | 11/2022 | ElHattab et al. |
| 11,522,857 | B1 | 12/2022 | Symons et al. |
| 11,558,449 | B1 | 1/2023 | Bicket et al. |
| 11,595,632 | B2 | 2/2023 | Tsai et al. |
| 11,599,097 | B1 | 3/2023 | Gal et al. |
| 11,606,736 | B1 | 3/2023 | Lloyd et al. |
| 11,611,621 | B2 | 3/2023 | ElHattab et al. |
| 11,620,909 | B2 | 4/2023 | Tsai et al. |
| 11,627,252 | B2 | 4/2023 | Delegard et al. |
| 11,641,388 | B1 | 5/2023 | Saunders et al. |
| 11,641,604 | B1 | 5/2023 | Lloyd |
| 11,643,102 | B1 | 5/2023 | Calmer et al. |
| 11,659,060 | B2 | 5/2023 | Davis et al. |
| 11,665,223 | B1 | 5/2023 | Duffield et al. |
| 11,669,714 | B1 | 6/2023 | Akhtar et al. |
| 11,671,478 | B1 | 6/2023 | Saunders et al. |
| 11,674,813 | B1 | 6/2023 | Chung et al. |
| 11,675,042 | B1 | 6/2023 | Lloyd et al. |
| 11,683,579 | B1 | 6/2023 | Symons et al. |
| 11,688,211 | B1 | 6/2023 | Calmer et al. |
| 11,694,317 | B1 | 7/2023 | Jain et al. |
| 11,704,984 | B1 | 7/2023 | ElHattab et al. |
| 11,709,500 | B2 | 7/2023 | Lloyd et al. |
| 11,710,409 | B2 | 7/2023 | Nanda et al. |
| 11,720,087 | B1 | 8/2023 | Heddleston et al. |
| 11,731,469 | B1 | 8/2023 | McGillan |
| 11,736,312 | B1 | 8/2023 | Xiao et al. |
| 11,741,760 | B1 | 8/2023 | Dubin et al. |
| 11,748,377 | B1 | 9/2023 | Zhang et al. |
| 11,752,895 | B1 | 9/2023 | Govan et al. |
| 11,756,346 | B1 | 9/2023 | Wu et al. |
| 11,756,351 | B1 | 9/2023 | Akhtar et al. |
| 11,758,096 | B2 | 9/2023 | Shah et al. |
| 11,776,328 | B2 | 10/2023 | Yang et al. |
| 11,780,446 | B1 | 10/2023 | Srinivasan et al. |
| 11,782,930 | B2 | 10/2023 | McGee et al. |
| 11,787,413 | B2 | 10/2023 | Tsai et al. |
| 11,800,317 | B1 | 10/2023 | Dugar et al. |
| 11,838,884 | B1 | 12/2023 | Dergosits et al. |
| 11,842,577 | B1 | 12/2023 | Harrison et al. |
| 11,847,911 | B2 | 12/2023 | ElHattab et al. |
| 11,855,801 | B1 | 12/2023 | Stevenson et al. |
| 11,861,955 | B1 | 1/2024 | Dubin et al. |
| 11,863,712 | B1 | 1/2024 | Young et al. |
| 11,866,055 | B1 | 1/2024 | Srinivasan et al. |
| 11,868,919 | B1 | 1/2024 | Zhang et al. |
| 11,875,683 | B1 | 1/2024 | Tsai et al. |
| 11,890,962 | B1 | 2/2024 | Govan et al. |
| 11,937,152 | B2 | 3/2024 | Hajimiri et al. |
| 11,938,948 | B1 | 3/2024 | Davis et al. |
| 11,959,772 | B2 | 4/2024 | Robbins et al. |
| 11,974,410 | B1 | 4/2024 | Lin et al. |
| 11,975,685 | B1 | 5/2024 | Innocenzi et al. |
| 11,989,001 | B1 | 5/2024 | ElHattab et al. |
| 11,995,546 | B1 | 5/2024 | Srinivasan et al. |
| 11,997,181 | B1 | 5/2024 | Davis et al. |
| 12,000,940 | B1 | 6/2024 | Lloyd et al. |
| 12,106,613 | B2 | 10/2024 | Calmer et al. |
| 12,117,546 | B1 | 10/2024 | Lloyd et al. |
| 12,126,917 | B1 | 10/2024 | Shemet et al. |
| 12,128,919 | B2 | 10/2024 | Calmer et al. |
| 12,140,445 | B1 | 11/2024 | Akhtar et al. |
| 12,150,186 | B1 | 11/2024 | Aguilar et al. |
| 12,165,360 | B1 | 12/2024 | Jain et al. |
| 12,168,445 | B1 | 12/2024 | Srinivasan et al. |
| 12,172,653 | B1 | 12/2024 | Akhtar et al. |
| 12,179,629 | B1 | 12/2024 | Govan et al. |
| 12,197,610 | B2 | 1/2025 | Wen et al. |
| 12,213,090 | B1 | 1/2025 | Dergosits et al. |
| 12,228,944 | B1 | 2/2025 | Dubin et al. |
| 12,253,617 | B1 | 3/2025 | Aguilar et al. |
| 12,256,021 | B1 | 3/2025 | Torres et al. |
| 12,260,616 | B1 | 3/2025 | Rajan et al. |
| 12,269,498 | B1 | 4/2025 | Rommel et al. |
| 12,289,181 | B1 | 4/2025 | Stevenson et al. |
| 12,306,010 | B1 | 5/2025 | Rommel et al. |
| 12,327,445 | B1 | 6/2025 | Eberhardt et al. |
| 12,328,639 | B1 | 6/2025 | Smith et al. |
| 12,344,168 | B1 | 7/2025 | Wang et al. |
| 12,346,712 | B1 | 7/2025 | Eberhardt et al. |
| 12,367,718 | B1 | 7/2025 | Calmer et al. |
| 12,368,903 | B1 | 7/2025 | Lin et al. |
| 12,426,007 | B1 | 9/2025 | Aguilar et al. |
| 12,445,285 | B1 | 10/2025 | McHugh et al. |
| 12,450,329 | B1 | 10/2025 | Torres et al. |
| 12,479,446 | B1 | 11/2025 | Jurden et al. |
| 12,501,178 | B1 | 12/2025 | Shemet et al. |
| 12,511,947 | B1 | 12/2025 | Symons et al. |
| 12,524,314 | B1 | 1/2026 | Rajadurai et al. |
| 12,534,097 | B1 | 1/2026 | Rajvanshi et al. |
| 12,561,624 | B1 | 2/2026 | Wang et al. |
| 12,565,143 | B1 | 3/2026 | Dhamija et al. |

(56) References Cited

U.S. PATENT DOCUMENTS

| | | | |
|---|---|---|---|
| 2002/0061758 | A1 | 5/2002 | Zarlengo et al. |
| 2002/0169850 | A1 | 11/2002 | Batke et al. |
| 2005/0286774 | A1 | 12/2005 | Porikli |
| 2006/0167591 | A1 | 7/2006 | McNally |
| 2008/0319602 | A1 | 12/2008 | McClellan et al. |
| 2009/0240427 | A1 | 9/2009 | Siereveld et al. |
| 2010/0049639 | A1 | 2/2010 | Ferro et al. |
| 2011/0276265 | A1 | 11/2011 | Husain |
| 2012/0201277 | A1 | 8/2012 | Tanner et al. |
| 2012/0235625 | A1 | 9/2012 | Takehara |
| 2012/0303397 | A1 | 11/2012 | Prosser |
| 2013/0162421 | A1 | 6/2013 | Inaguma et al. |
| 2013/0211559 | A1 | 8/2013 | Lawson et al. |
| 2013/0244210 | A1 | 9/2013 | Nath et al. |
| 2014/0012492 | A1 | 1/2014 | Bowers et al. |
| 2014/0095061 | A1 | 4/2014 | Hyde |
| 2014/0098060 | A1 | 4/2014 | McQuade et al. |
| 2014/0195106 | A1 | 7/2014 | McQuade et al. |
| 2014/0278108 | A1 | 9/2014 | Kerrigan et al. |
| 2014/0328517 | A1 | 11/2014 | Gluncic |
| 2014/0337429 | A1 | 11/2014 | Asenjo et al. |
| 2014/0354227 | A1 | 12/2014 | Tyagi et al. |
| 2014/0354228 | A1 | 12/2014 | Williams et al. |
| 2015/0044641 | A1 | 2/2015 | Chauncey et al. |
| 2015/0074091 | A1 | 3/2015 | Walkin et al. |
| 2015/0226563 | A1 | 8/2015 | Cox et al. |
| 2015/0283912 | A1 | 10/2015 | Shimizu et al. |
| 2016/0275376 | A1 | 9/2016 | Kant |
| 2016/0288744 | A1 | 10/2016 | Rutherford et al. |
| 2016/0343091 | A1 | 11/2016 | Han et al. |
| 2016/0375780 | A1 | 12/2016 | Penilla et al. |
| 2017/0039784 | A1 | 2/2017 | Gelbart et al. |
| 2017/0060726 | A1 | 3/2017 | Glistvain |
| 2017/0102463 | A1 | 4/2017 | Hwang |
| 2017/0123397 | A1 | 5/2017 | Billi et al. |
| 2017/0140603 | A1 | 5/2017 | Ricci |
| 2017/0195265 | A1 | 7/2017 | Billi et al. |
| 2017/0214807 | A1* | 7/2017 | Pring .................. G06F 13/4282 |
| 2017/0263049 | A1 | 9/2017 | MacDonald et al. |
| 2017/0278004 | A1 | 9/2017 | McElhinney et al. |
| 2017/0286838 | A1 | 10/2017 | Cipriani et al. |
| 2017/0291611 | A1 | 10/2017 | Innes et al. |
| 2017/0332199 | A1 | 11/2017 | Elliott et al. |
| 2017/0345283 | A1 | 11/2017 | Kwon et al. |
| 2017/0366935 | A1 | 12/2017 | Ahmadzadeh et al. |
| 2018/0001771 | A1 | 1/2018 | Park et al. |
| 2018/0012196 | A1 | 1/2018 | Ricci et al. |
| 2018/0025636 | A1 | 1/2018 | Boykin et al. |
| 2018/0063576 | A1 | 3/2018 | Tillman et al. |
| 2018/0093672 | A1 | 4/2018 | Terwilliger et al. |
| 2018/0234514 | A1 | 8/2018 | Rajiv et al. |
| 2018/0262724 | A1 | 9/2018 | Ross |
| 2018/0356800 | A1 | 12/2018 | Chao et al. |
| 2018/0364686 | A1 | 12/2018 | Naidoo et al. |
| 2019/0003848 | A1 | 1/2019 | Hoten et al. |
| 2019/0118655 | A1 | 4/2019 | Grimes et al. |
| 2019/0174158 | A1 | 6/2019 | Herrick et al. |
| 2019/0244301 | A1 | 8/2019 | Seth et al. |
| 2019/0286948 | A1 | 9/2019 | Sathyanarayana et al. |
| 2019/0318419 | A1 | 10/2019 | VanderZanden |
| 2019/0327590 | A1 | 10/2019 | Kubo et al. |
| 2019/0327613 | A1 | 10/2019 | Bicket et al. |
| 2020/0074397 | A1 | 3/2020 | Burda et al. |
| 2020/0139847 | A1 | 5/2020 | Baumer et al. |
| 2020/0150739 | A1 | 5/2020 | Tuan et al. |
| 2020/0162489 | A1 | 5/2020 | Bar-Nahum et al. |
| 2020/0342230 | A1 | 10/2020 | Tsai et al. |
| 2020/0342235 | A1 | 10/2020 | Tsai et al. |
| 2020/0342274 | A1 | 10/2020 | ElHattab et al. |
| 2020/0342506 | A1 | 10/2020 | Levy et al. |
| 2020/0342611 | A1 | 10/2020 | ElHattab et al. |
| 2020/0344301 | A1 | 10/2020 | ElHattab et al. |
| 2020/0371773 | A1 | 11/2020 | Kato et al. |
| 2020/0389415 | A1 | 12/2020 | Zhao et al. |
| 2021/0006950 | A1 | 1/2021 | Hajimiri et al. |
| 2022/0289203 | A1 | 9/2022 | Makilya et al. |
| 2023/0199138 | A1* | 6/2023 | Watanabe .............. H04N 5/268 348/159 |
| 2023/0219592 | A1 | 7/2023 | Calmer et al. |
| 2023/0298410 | A1 | 9/2023 | Calmer et al. |
| 2024/0003749 | A1 | 1/2024 | Lin et al. |
| 2024/0063596 | A1 | 2/2024 | Pandian et al. |
| 2024/0146629 | A1 | 5/2024 | Lloyd |
| 2025/0002033 | A1 | 1/2025 | Calmer et al. |

FOREIGN PATENT DOCUMENTS

| | | | |
|---|---|---|---|
| WO | WO 2019/133533 | A1 | 7/2019 |
| WO | WO 2023/244513 | A1 | 12/2023 |

* cited by examiner

TRANSLATION OF CAMERA OPERATIONS USING A MANAGEMENT SERVER SYSTEM

CROSS-REFERENCE TO RELATED APPLICATIONS

This application claims the benefit of priority of U.S. Provisional Patent Application No. 63/381,899, filed Nov. 1, 2022, entitled "TRANSLATION OF CAMERA OPERATIONS USING A MANAGEMENT SERVER SYSTEM," which is hereby incorporated by reference herein in its entirety and for all purposes. Any and all applications for which a foreign or domestic priority claim is identified in the Application Data Sheet as filed with the present application are hereby incorporated by reference under 37 CFR 1.57 for all purposes and for all that they contain.

TECHNICAL FIELD

Embodiments of the present disclosure relate to devices, systems, and methods that translate operations for performance by a camera.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Controlling cameras within an environment to modify parameters (e.g., settings) of the cameras in real time requires significant data storage and processing power. Each of the cameras may utilize separate interfaces, systems, code languages, etc. for control of the respective camera. The use of separate interfaces, systems, code languages, etc. may limit the effectiveness and usability of a management system as the management system may be unable to directly and uniformly control each of the cameras. Thus, control of the cameras is typically limited to individual control of the cameras using separate interfaces, systems, code languages, etc.

SUMMARY

The systems, methods, and devices described herein each have several aspects, no single one of which is solely responsible for its desirable attributes. Without limiting the scope of this disclosure, several non-limiting features will now be described briefly.

Further, as described herein, according to various embodiments, systems and or devices may be configured and/or designed to control cameras utilizing a uniform process (e.g., a uniform system, interface, code language, etc.). The systems and/or devices can utilize camera identification data to identify how to translate a requested operation to generate a translated operation that is usable by the particular camera (e.g., particular make, model, configuration, etc. of camera). Further, the systems and/or devices can provide the translated operation to the camera to cause performance of a particular action. Additionally, the present disclosure describes various embodiments of camera control systems and interfaces that are the result of significant development. This non-trivial development has resulted in the camera control systems and interfaces described herein which may provide significant increases and advantages over previous systems including increases in efficiency, cost-effectiveness, and accuracy. The camera control systems and interfaces may reduce the time required to control a camera (e.g., via a site visibility system). Specifically, the camera control systems and interfaces may increase the reliability of controlling a camera such that cameras can be controlled in a more uniform and reliable manner as compared to existing camera control systems. For example, traditional camera control systems may utilize multiple different systems, interfaces, code languages, etc. to control cameras whereas the camera control system as described below may utilize a uniform system that controls various cameras (e.g., makes, models, configurations, capabilities, etc.) using operations that are translated for the particular camera. Therefore, the camera control system represents a significant technological improvement over traditional camera control systems.

Further, traditional camera control systems may be limited to controlling cameras using a textual input (e.g., a section of code defining the operation). For example, traditional camera control systems may be limited to identifying and executing operations that are defined using a textual input in a particular code language or via a particular system and/or interface. In order to generate the operations and cause the camera control system to perform the operation, the user may need to be trained on operation generation, the particular code language, etc. However, such a camera control system may prove unsatisfactory when a user, without prior knowledge of the code language, provides an operation as the camera control system may not recognize operations that are not provided in the code language (or are not defined correctly using the code language). For example, a user without prior knowledge of the code language or insufficient knowledge of the code language may incorrectly define the operation resulting in the incorrect execution of the operation (e.g., causing performance of a different action and/or failing to cause performance of the action). Therefore, in such a camera control system, it may not be possible for a user without experience in a particular code language to define an operation for execution by the camera control system. This may be undesirable as users without prior experience in the particular code language may be unable to generate operations for execution by the camera control system, which can result in an inefficient and costly process.

Various embodiments of the present disclosure provide improvements to various technologies and technological fields, and practical applications of various technological features and advancements. For example, as described above, existing data processing systems are limited in various ways, and various embodiments of the present disclosure provide significant improvements over such technology, and practical applications of such improvements. Additionally, various embodiments of the present disclosure are inextricably tied to, and provide practical applications of, computer technology. While currently available devices may enable a system to control a camera, such devices may not enable the system to directly and uniformly control multiple cameras, such as cameras having various configurations. Further, such devices may not enable the system to control the camera using a uniform (e.g., generic) interface, system, code language, etc. The lack of such a uniform interface, system, code language, etc. may lead to inefficiencies as a camera may utilize a particular interface, system, code language, etc. Additionally, during the control of a camera, the amount of data being sent to the camera (e.g., via a site visibility system) can be significant so just managing this data can be a significant issue.

Advantageously, various embodiments of the present disclosure may overcome various disadvantages of prior systems and methods. A management server system may include a computer readable storage medium having program instructions embodied therewith and one or more processors configured to execute the program instructions. The one or more processors may obtain, via a first user interface of a computing device, a user input, the user input identifying a camera and an operation associated with the camera. The one or more processors may identify a first set of camera identification data associated with the camera. The first set of camera identification data may identify a camera model of the camera and a manufacturer of the camera. The one or more processors may identify a translation table. The translation table may map a plurality of operations, a plurality of sets of camera identification data, and a manner of translating each of the plurality of operations for each of the plurality of sets of camera identification data. A first manner of translating the operation for the first set of camera identification data may cause generation of a first translated operation and a second manner of translating the operation for a second set of camera identification data may cause generation of a second translated operation. The one or more processors may translate the operation utilizing the first manner of translating the operation based on the translation table linking the first manner of translating the operation to the first set of camera identification data. The one or more processors may provide the first translated operation to a site visibility system associated with the camera. The site visibility system may provide the first translated operation to the camera. Providing the first translated operation to the camera may cause performance of an action and providing the second translated operation to the camera may not cause the performance of the action. The one or more processors may obtain, from the camera, via the site visibility system, a response. The response may indicate a status of the performance of the action. The one or more processors may cause display, via a second user interface of the computing device, of response data identifying the status of the performance of the action.

According to various embodiments of the present disclosure, a management server system can include a computer readable storage medium having program instructions embodied therewith and one or more processors configured to execute the program instructions. The one or more processors may obtain, from a computing device, an input, the input identifying a camera and an operation associated with the camera. The one or more processors may identify a camera type of the camera. The one or more processors may identify a translation table. The translation table may identify a plurality of operations and a plurality of camera types. The one or more processors may translate the operation based on the camera type and the translation table to generate a translated operation. The one or more processors may provide the translated operation to the camera. Providing the translated operation to the camera may cause the camera to perform an action corresponding to the translated operation.

In various embodiments, the translation table may link the plurality of operations, the plurality of camera types, and a manner of translating each of the plurality of operations for each of the plurality of camera types. The one or more processors further may translate the operation further utilizing a particular manner of translating the operation based on the translation table linking the particular manner of translating the operation to the camera type.

In various embodiments, the one or more processors further may obtain, from the computing device, a second input, the second input identifying a second camera and the operation. The one or more processors further may identify a second camera type of the second camera. The one or more processors further may translate the operation based on the second camera type and the translation table to generate a second translated operation. The one or more processors further may provide the second translated operation to the second camera.

In various embodiments, the one or more processors further may identify a manufacturer of the camera based on the camera type of the camera. The one or more processors further may translate the operation further based on the manufacturer of the camera.

In various embodiments, the camera type may be based on a camera protocol of the camera.

In various embodiments, the camera protocol may be based on an ONVIF camera protocol or an Axis camera protocol.

In various embodiments, the one or more processors further may obtain, from the camera, a response. The response may indicate a status of performance of the action. The one or more processors further may cause display, via a user interface of the computing device, of response data identifying the status of the performance of the action.

In various embodiments, the one or more processors further may cause display, via the computing device, of a user interface identifying a plurality of cameras and the plurality of operations. The plurality of cameras may include the camera. The input may include user input obtained via the user interface.

In various embodiments, the plurality of cameras may be associated with the plurality of camera types. The one or more processors further may determine, for each of the plurality of camera types, a manner of translating each of the plurality of operations.

In various embodiments, the one or more processors further may obtain, via the user interface, additional input identifying a particular manner of translating the operation to generate the translated operation.

In various embodiments, the one or more processors further may identify a particular manner of translating the operation to generate the translated operation. To identify the particular manner of translating the operation, the one or more processors further may identify a test operation associated with the operation. Further, the one or more processors may provide the test operation to the camera. Providing the test operation to the camera may cause the camera to perform an additional action corresponding to the test operation. Further, the one or more processors may obtain, from the camera, feedback corresponding to the additional action. Further, the one or more processors may identify the particular manner of translating the operation based on the feedback.

In various embodiments, the feedback may include one or more images. The one or more processors further may analyze the one or more images. To analyze the one or more images, the one or more processors may compare a first image corresponding to a time period prior to performance of the additional action to a second image corresponding to a time period subsequent to the performance of the additional action. Further, the one or more processors may determine the additional action corresponds to the action based on analyzing the one or more images. The one or more processors further may identify the particular manner of translating the operation further based on determining the additional action corresponds to the action.

In various embodiments, the operation may include a first sub-operation associated with the camera and a second sub-operation associated with the camera. The one or more processors further may combine the first sub-operation and the second sub-operation to generate the operation. Performance of the action may include performance of a first sub-action corresponding to the first sub-operation and performance of a second sub-action corresponding to the second sub-operation.

In various embodiments, the one or more processors further may identify a first sub-operation associated with the camera and a second sub-operation associated with the camera. The one or more processors further may determine the first sub-operation and the second sub-operation are combinable. The one or more processors further may combine the first sub-operation and the second sub-operation to generate the operation based on determining the first sub-operation and the second sub-operation are combinable.

In various embodiments, the operation may include at least one of a bit rate adjustment, a frame rate adjustment, a resolution adjustment, a password adjustment, a zoom operation, a flip operation, a rotate operation, a mirror operation, a brightness operation, a contrast operation, a saturation operation, a sharpness operation, or an internet protocol settings adjustment.

In various embodiments, the operation may correspond to plurality of translated operations associated with a plurality of cameras. Each translated operation of the plurality of translated operations may cause a camera associated with the particular translated operation to perform the action.

In various embodiments, the plurality of operations may include a plurality of generic operations. The one or more processors further may determine the operation corresponds to the translated operation. The one or more processors further may identify a manner of translating the operation to generate the translated operation. The one or more processors further may link the translated operation to the operation within the translation table based on the manner of translating the operation. The one or more processors further may translate the operation based on linking the translated operation to the operation.

In various embodiments, the one or more processors further may determine an additional operation associated with the camera without obtaining additional input corresponding to the additional operation from the computing device. The one or more processors further may translate the additional operation based on the camera type and the translation table to generate an additional translated operation. The one or more processors further may automatically provide the additional translated operation to the camera. Providing the additional translated operation to the camera may cause the camera to automatically perform an additional action corresponding to the additional translated operation.

According to various embodiments of the present disclosure, a method may include obtaining, from a computing device, an input, the input identifying an image sensor and an operation associated with the image sensor. The method may further include identifying an image sensor type associated with the image sensor. The method may further include identifying a lookup table. The lookup table may identify the operation and the image sensor type. The method may further include translating the operation based on the image sensor type and the lookup table to generate a translated operation. The method may further include causing the translated operation to be provided to the image sensor. Providing the translated operation to the image sensor may cause the image sensor to perform an action corresponding to the translated operation.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1:
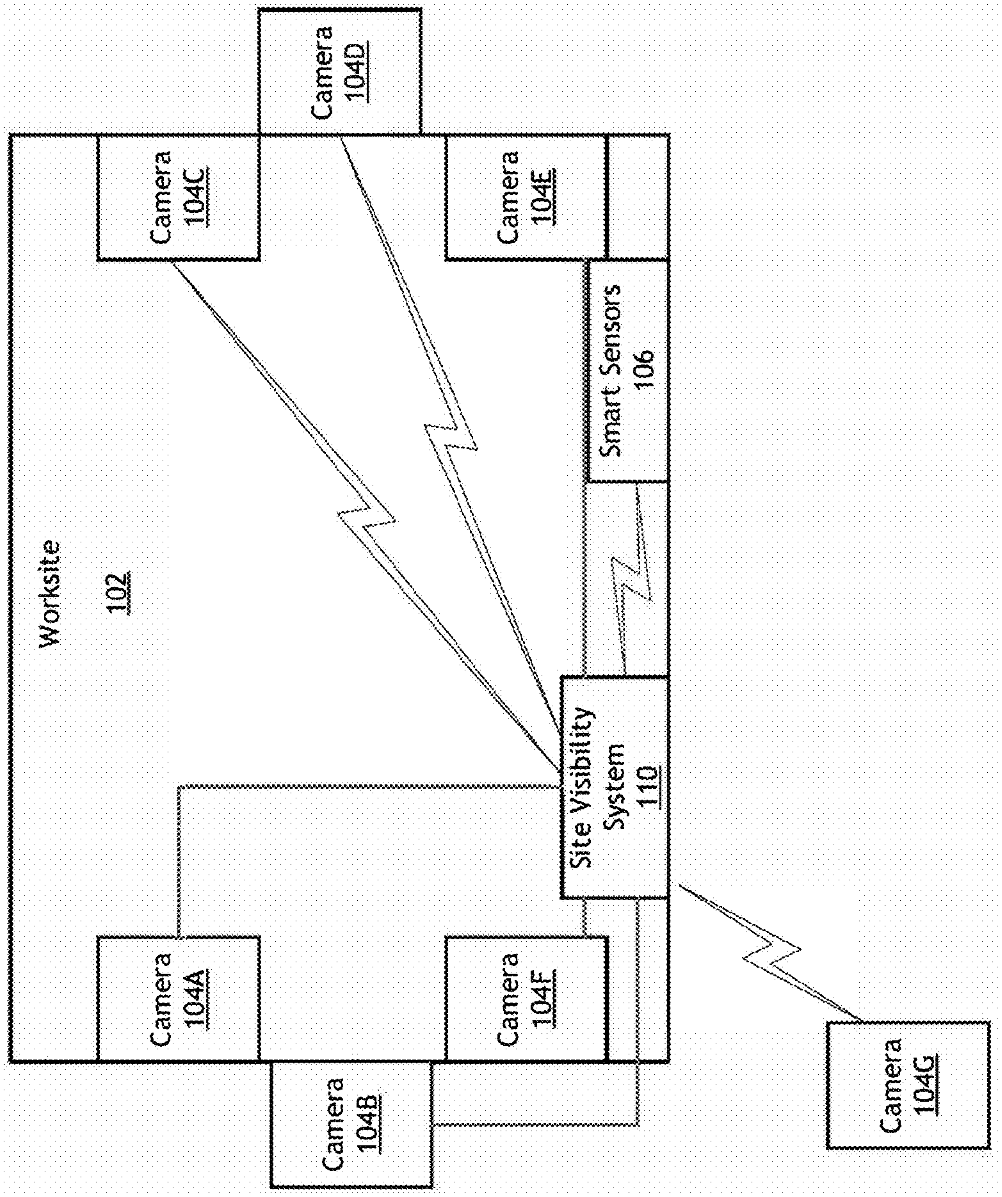
FIG. 1 is a block diagram of an example worksite with multiple cameras communicating with a site visibility system, which is referred to herein as a site visibility system.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Overview

As mentioned above, according to various embodiments of the present disclosure, an improved system is configured to control a camera to perform a particular action. For example, the improved system can receive an operation and utilize camera identification data and a lookup table (e.g., a translation table) to identify translated operations for performance by the camera. Further, the improved system can route the translated operations to the camera to cause the camera to perform the action. Therefore, the improved system can enable uniform operations to be provided and can automatically translate the uniform operations to generate translated operations based on the camera identification data. The camera identification data may indicate a camera type. The camera type may include a camera model, a camera manufacturer, a camera interface, a camera code language, a camera brand, an update status, camera software, camera hardware, camera capabilities, etc. The system may utilize the camera identification data to identify translated operations. For example, the camera identification data may indicate that a camera is associated with a particular camera manufacturer (e.g., Acme) and, based on the camera manufacturer, the system can generate a translated operation that causes the camera to perform an action requested by a user (e.g., change the password, change the zoom level, etc.). Therefore, the improved system may provide an improved process for automatically controlling cameras in a uniform manner. Additionally, the improved system may enable multiple cameras, that utilize different interfaces, systems, code languages, etc., to be controlled via a uniform interface, system, code language, etc.

As discussed further herein, the system can cause display of a first user interface that may identify one or more operations to be performed by a camera. The one or more operations may be uniform operations (e.g., the operations may be generic to camera model, camera manufacturer, etc.) such that a user can request a camera associated with any of a plurality of a camera types to perform an action corresponding to the operation. For example, the first user interface may identify a zoom operation such that the system can cause cameras having any of a plurality of camera types to perform a corresponding zoom action. In some cases, the first user interface may identify one or more camera types of a camera for which the operation can be provided to cause performance of the corresponding action. For example, the first user interface may identify that the operation(s) may be utilized to cause ACME cameras, GENERIC 123 cameras, etc. to perform the corresponding action.

A user may interact with the first user interface to provide input to the camera control system. For example, a user can, via a user computing device, interact (e.g., select) a particular operation for a particular camera. By selecting the particular operation and the particular camera, the user may indicate that an action corresponding to the operation should be performed by the camera. Therefore, the system can receive an input (e.g., a user input) via the first user interface. In some cases, the user can interact with the first user interface to select the particular camera.

In response to the input, the system can identify camera identification data associated with the camera requested to perform the particular action. The system may obtain the camera identification data via the first user interface, a user computing device, data storage, a separate system, etc. The camera identification data may identify a camera type of the camera. For example, the camera identification data may identify a camera manufacturer of the camera as ACME.

The system may also identify a lookup table. The lookup table may identify camera identification data, operations, and a manner of translating one or more operations based on a subset of the camera identification data. For example, the lookup table may identify a particular manner of translating (e.g., one or more translation tasks) a particular operation based on a subset of camera identification data (e.g., a particular camera manufacturer). In some cases, the system may obtain the lookup table (e.g., from a user computing device, from a separate system, etc.). In other cases, the system may generate at least a portion of the lookup table. For example, the system may provide operations to a camera, determine an action performed by the camera in response to the provided operation, and map the provided operation to the camera. Further, the system may map the provided operation to one or more translated operations based on the performed action.

The system can utilize the camera identification data and the lookup table to identify a manner of translating a particular operation. For example, the system can utilize the camera identification data and the operation to identify a manner of translating the operation within the lookup table. In response to identifying the manner of translating the particular operation, the system may translate the operation utilizing the manner of translating.

The system can provide the translated operation to the camera. For example, the system can provide the translated operation to a site visibility system (e.g., a vehicle gateway device) associated with the camera. In some cases, the system may be the site visibility system. For example, the site visibility system may generate the translated operation. Based on obtaining and/or generating the translated operation, the site visibility system may provide the translated operation to the camera to cause the camera to perform the action.

Based on obtaining the translated operation, the camera may perform the action. The camera may provide a response to the system and/or the site visibility system based on performing the action. For example, the response may include a status of the performance of the action (e.g., in process, incomplete, complete, etc.). In some cases, the system can cause display of the status of the performance of the action via a second user interface. Therefore, the system can utilize uniform operations to generate translated operations for cameras that cause performance of an action. Further, the system can cause display of information identifying a status of the performance of the action.

Terms

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Backend Server System (also referred to herein as a "management server system", "backend," "cloud," or "cloud server"): one or more network-accessible servers configured to communicated with devices, sensors (e.g., cameras), site visibility systems, (e.g., a vehicle gateway device and/or communication circuitry of a dashcam). A management server system is typically configured to communicate with multiple site visibility systems. Thus, the management server system may have context and perspective that individual site visibility systems do not have. For example, the management server system may include data associated with a large quantity of vehicles, such as vehicles across a fleet, multiple fleets, and/or within a geographic area. Thus, the management server system may perform analysis of asset data across multiple vehicles and between groups of vehicles (e.g., comparison of fleets operated by different entities). A backend server system may also include a feedback system that periodically updates event models used by site visibility systems to provide real-time detection of events, such as safety events, that may trigger alerts. For example, when the backend server has optimized an event model based on analysis of asset data associated with many safety events, an updated event model may be sent to the site visibility systems.

Camera: an electronic device that includes one or more sensors configured to obtain video data and/or audio data. Cameras at a worksite, for example, may be manufactured by multiple entities and have varying capabilities. For example, some cameras (e.g., particular models of cameras) may stream only a single resolution of video data, such as a high-resolution video stream, while other cameras may stream both a high-resolution video stream and a low-resolution video stream. The cameras may be in communication with a local site visibility system, or local site visibility system, via one or more wired and/or wireless connections, such as via a local area network.

Site Visibility System (also referred to herein as a "gateway device," a "vehicle gateway device," a "gateway," a "video gateway device," etc.): a system which is configured to communicate with one or more sensors (e.g., cameras). For example, the site visibility system may be a system in a vehicle communicating with one or more sensors in the vehicle, e.g., in a separate dashcam mounted in the vehicle, and with a backend server system. In some embodiments, a site visibility system can be installed within a vehicle by coupling an interface of the site visibility system to an on-board diagnostic (OBD) port of the vehicle. A site visibility system may include short-range communication circuitry, such as near field communication ("NFC"), Bluetooth ("BT"), Bluetooth Low Energy ("BLE"), etc., for communicating with sensors and/or other devices within a particular proximity.

Network Discovery Protocols: Any process that may be performed to identify possible cameras connected to a network. Certain specific examples of network discovery protocols are discussed herein, but the systems and methods for camera discovery and communication are not limited to only those network discovery protocols specifically discussed herein. Depending on the implementation, network discovery protocols may be entirely automatic, discovering and authenticating all cameras on a network without human intervention, and/or may involve some level of human interaction, such as provision of login credentials for a particular identified camera. Network discovery protocols may include, for example:

- AXIS: certain cameras may be configured to communicate using the axis protocol, which allows automatic discovery of any such devices within a network. For example, an AXIS enabled device may automatically be assigned an IP address when connected to a network (e.g., from a DHCP server) so a request to the IP address assigned to an AXIS device allows communication with the device. Similarly, devices may use the Bonjour protocol from Apple to automatically discover devices within a network configured for discovery via that protocol.
- Nmap (Network Mapper): a network scanner that discovers hosts and services on a computer network by sending packets and analyzing the responses. For example, Nmap may identify open RTSP (Real-Time Streaming Protocol) ports on a network. RTSP defines control sequences that may be useful in coordinating multimedia transmission, such as streaming video data from a camera supporting RTSP communications.
- ARP (Address Resolution Protocol): network scanning protocol that identifies MAC (Media Access Control) addresses of devices on a network. For example, an ARP request may be sent to an IP address on a network requesting the MAC address of the associated device. The MAC address may then be mapped to that IP address. For example, the first three alphanumeric characters of a MAC address may be specific to a manufacturer and model of a device.

The MAC address of a device is a unique identifier assigned to a network interface controller (NIC), such as a NIC that coordinates communications with a camera. As discussed further herein, MAC addresses may be used to identify a manufacturer and/or model of an identified device, such as the manufacturer and model of an identified camera on a network.

- ONVIF (Open Network Video Interface Forum): an industry standard for the interface of physical IP-based security devices. ONVIF defines a network video communication framework that includes device discovery. Once an ONVIF device has been assigned an IP address (e.g., from a DHCP server), site visibility systems (or other devices) on the network can discover the device IP address using an ONVIF device discovery request. During device discovery, the site visibility system may send queries on the network to a multicast address and an ONVIF device on the network will receive the query and answer to the site visibility system. The reply may include device information, including the device's IP address.
- Host Scan: Any scan for host devices on a network. A host scan may be performed on all IP addresses within a network or certain subnets with the network.

High-resolution video stream: video files that are renderable to depict significant detail. For example, high-resolution video may be 1080p or 1440p video. The term high-resolution video does not signify any particular resolution or frame rate, but more generally indicates a video file that holds more image detail than a corresponding low-resolution video.

Low-resolution video stream: video files that are renderable to depict less detail than a corresponding standard or high-resolution video file. For example, low-resolution video may be 240p or 360p or less. The term low-resolution video does not signify any particular resolution or frame rate, but more generally indicates a video file that holds less image detail than a corresponding high-resolution video.

Standard-resolution video stream: video files that are renderable to depict less detail that high-resolution video files. For example, standard-resolution video may be 720p video. The term standard-resolution video does not signify any particular resolution or frame rate, but more generally indicates a video file that holds less image detail than high-resolution video and more detail than low-resolution video.

Event Data: data associated with an event, such as a set of sensor data (e.g., metadata and/or asset data), such as photographs, video files, etc., associated with a detected safety event.

Feature detection: a computerized process that processes video data to identify features in one or more images of the video data and which may be provided to one or more even models to determine if an event of interested is detected. Feature detection may be performed by a local site visibility system and/or at a cloud site visibility system to detect events of interest, such as safety events.

Event Model (or "triggering criteria"): a set of logic that may be applied to sensor data to determine when an event has occurred. An event model may be, for example, an algorithm, statistical model, or neural network that takes as input one or more types of sensor data, such as a standard-resolution video stream from each of one or more cameras. An event model may be stored in any format, such as a list of criteria, rules, thresholds, and the like, that indicate occurrence of an event. Event models may also receive input from a feature detection component configured to detect features in video data. Event models may be executed by a local and/or cloud site visibility system.

Event models and/or feature detection may be performed by using machine learning components that can be used to assist in identification of features (e.g., a person within a restricted area) that may trigger events. For example, a machine learning component can implement machine learning algorithms or artificial intelligence (AI) to generate and/or update neural networks that are executed by a processor (e.g., at a local and/or cloud site visibility system). In some embodiments, the machine learning component can use one or more machine learning algorithms to generate one or more models or parameter functions for the detections. A feature detection module may comprise a plurality of layered and/or hierarchical models that each produce an output that is pooled together. Further, the feature detection module may comprise a thin layer of models that is independently defined and tunable. The machine learning component can be configured to generate an event model that understands which types of data indicate which types of detections. One or more of these event models may be used to determine an expected value or occurrence based on analysis of received data. In some embodiments, event models can include event detection criteria designated by a user, admin, or automatically. For example, the criteria can indicate which types of detected features to monitor, record, or analyze. By designating specific types of detections, resources (e.g., processing power, bandwidth, etc.) can be preserved for only the types of feature detections desired.

Various types of algorithms may be used by the machine learning component to generate the event detection models (e.g., that perform feature detection and related event detection). For example, certain embodiments herein may use a logistical regression model, decision trees, random forests, convolutional neural networks, deep networks, or others. However, other event detection models are possible, such as a linear regression model, a discrete choice model, or a generalized linear model. The machine learning algorithms can be configured to adaptively develop and update the event detection models over time based on new input received by the machine learning component. For example, the event detection models executed by the local site visibility system may be regenerated on a periodic basis (e.g., by the cloud site visibility system) as new received data is available to help keep the predictions in the event detection model more accurate as the data is collected over time.

Some non-limiting examples of machine learning algorithms that can be used to generate and update event detection models can include supervised and non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naïve Bayes), clustering algorithms (such as, for example, k-means clustering), association rule learning algorithms (such as, for example, Apriori algorithms), artificial neural network algorithms (such as, for example, Perceptron), deep learning algorithms (such as, for example, Deep Boltzmann Machine), dimensionality reduction algorithms (such as, for example, Principal Component Analysis), ensemble algorithms (such as, for example, Stacked Generalization), and/or other machine learning algorithms.

These machine learning algorithms may include any type of machine learning algorithm including hierarchical clustering algorithms and cluster analysis algorithms, such as a k-means algorithm. In some cases, the performing of the machine learning algorithms may include the use of an artificial neural network. By using machine-learning techniques, copious amounts (such as terabytes or petabytes) of received data may be analyzed to generate models without manual analysis or review by one or more people.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores.

Accordingly, each database referred to herein (e.g., in the description herein and/or the figures of the present application) is to be understood as being stored in one or more data stores. Additionally, although the present disclosure may show or describe data as being stored in combined or separate databases, in various embodiments such data may be combined and/or separated in any appropriate way into one or more databases, one or more tables of one or more databases, etc. As used herein, a data source may refer to a table in a relational database, for example.

Example Camera Systems and Functions

FIG. 1 is a block diagram of an example worksite 102 with multiple cameras 104 communicating with a site visibility system 110 (e.g., a video gateway device). The worksite 102 may represent a single room, such as a workroom of a manufacturing facility, or may represent multiple rooms, buildings, and/or outdoor areas. For example, in another embodiment, the worksite 102 includes multiple buildings and/or outdoor areas associated with a particular entity, such as a business campus of a company that includes multiple buildings and outdoor locations.

In the example of FIG. 1, the site visibility system 110, which may also be referred to as a local site visibility system or video gateway, communicates with each of multiple cameras 104 at or near the worksite 102. Depending on the implementation, cameras may be connected via wired connections, such as cameras 104A, 104B, 104F, 104E in the example of FIG. 1, or via wireless connections, such as cameras 104G, 104C, and 104D in the example of FIG. 1. Additionally, the cameras may be manufactured by different entities and have different capabilities. For example, camera 104A may be configured to output only a single video stream (e.g., a high-resolution video stream), while camera 104B may be configured to output multiple video streams (e.g., a high-resolution and a low-resolution video stream). Advantageously, the site visibility system 110 is configured to automatically identify cameras connected to the network (e.g., a secured local area network), authenticate with the cameras, and determine capabilities of each the cameras 104, which may be useful in customizing any video stream generation processes that are based on the particular capabilities of particular cameras, as discussed further below.

FIG. 1 also includes smart sensors 106 which represent additional sensors that may be configured to communicate with the site visibility system 110. Any other type of sensor, such as temperature, moisture, motion, distance, etc. may be installed at the worksite 102 and configured to communicate with the site visibility system 110 either wirelessly or via a wired connection.

Figure 2:
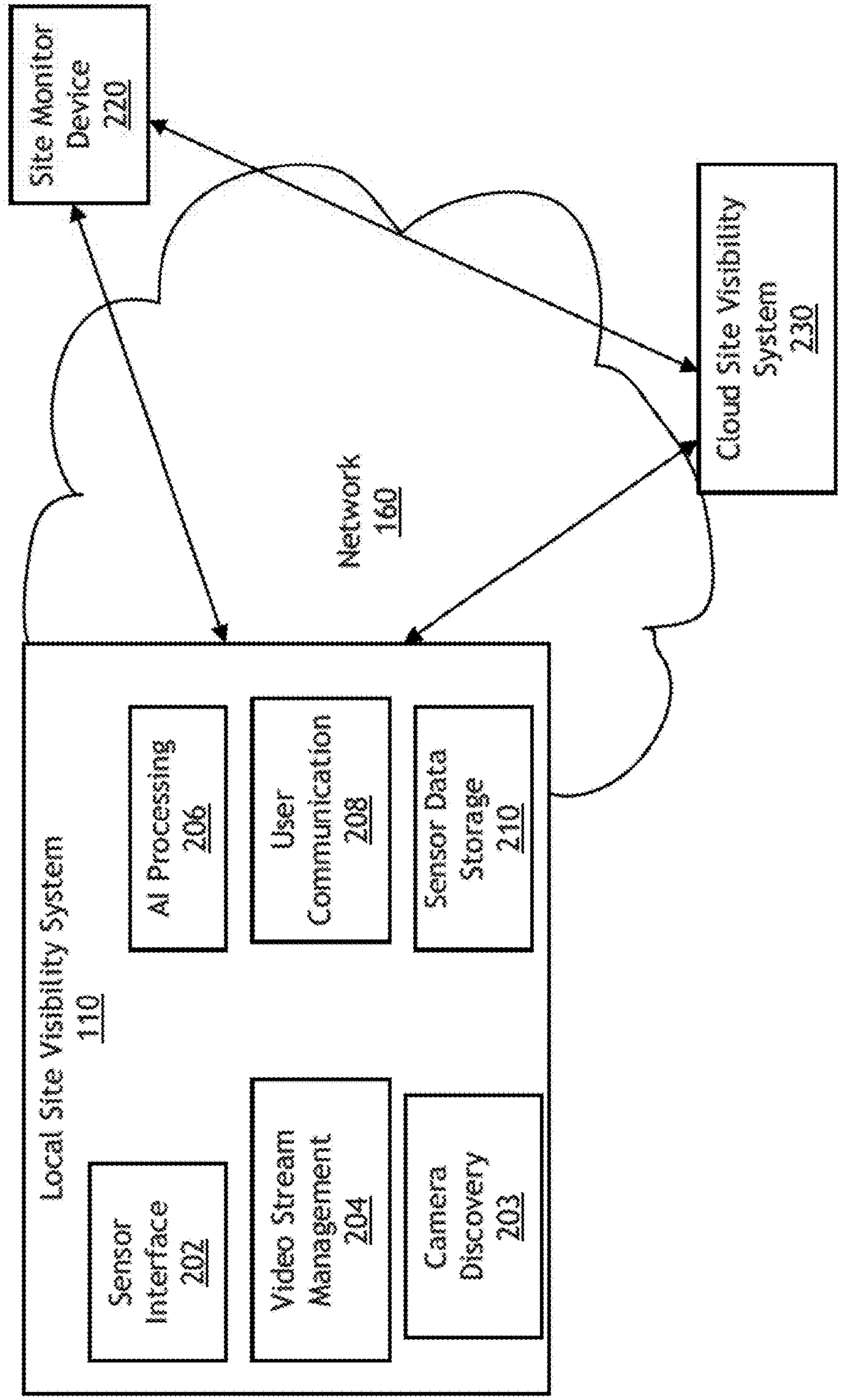
FIG. 2 is a block diagram of the example site visibility system (or "local" site visibility system) in communication with a site monitor device and with a cloud site visibility system.

FIG. 2 is a block diagram of the example site visibility system 110 (or "local" site visibility system 110) in communication with a site monitor device 220 and with a cloud site visibility system 230. In this example, the local site visibility system 110 communicates sensor data, such as one or more video streams acquired from cameras 104, to the site monitor device 220, which may be a mobile phone, tablet, laptop, desktop computer, or other device, operated by a site manager, which generally denotes an individual that has an interest in monitoring activity at the worksite 102, such as a site manager, owner, safety manager, etc.

Figure 3:
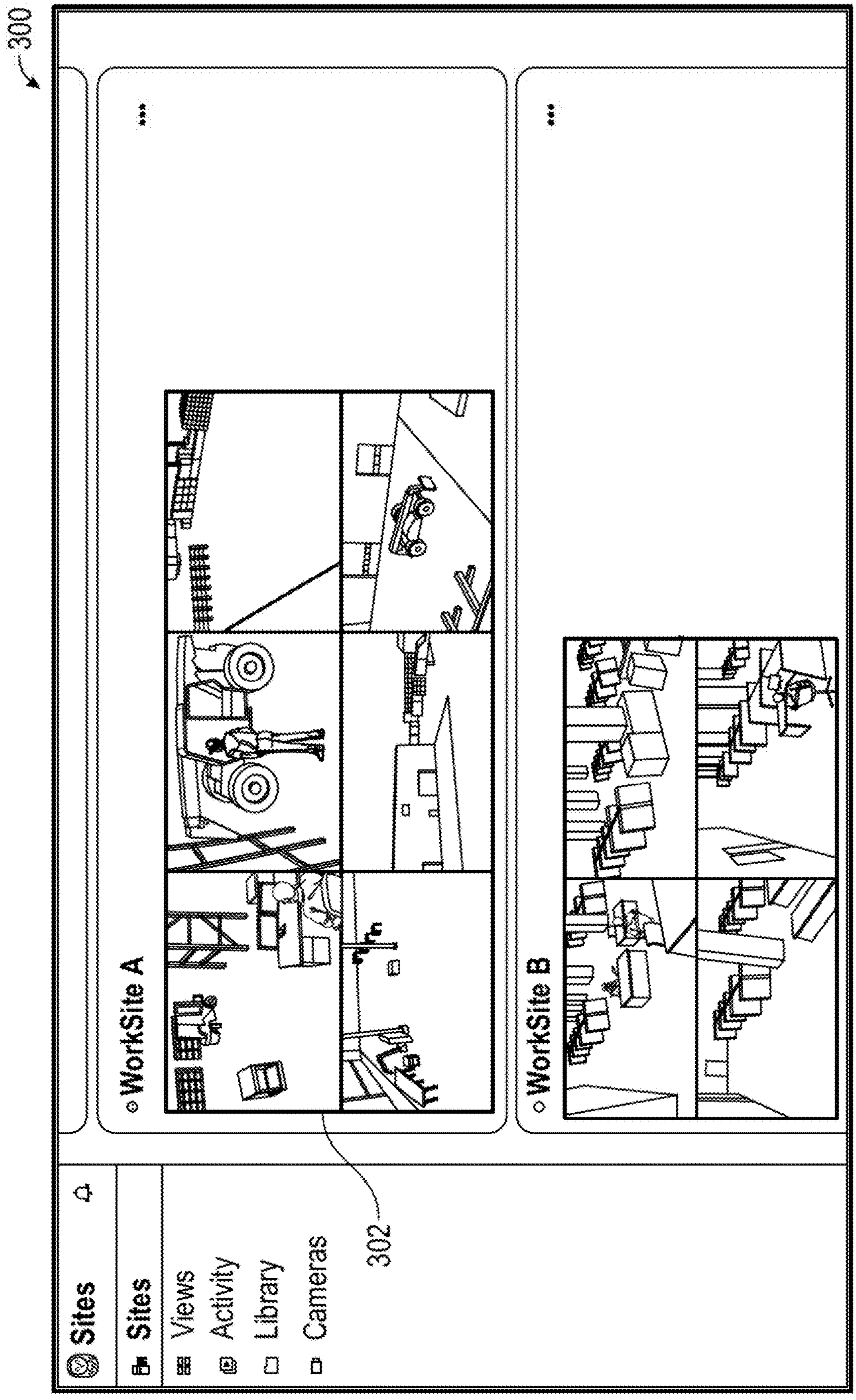
FIG. 3 is an example monitoring user interface that may be displayed on the site monitor device.

FIG. 3 is an example monitoring user interface 300 that may be displayed on the site monitor device 220. In the example of FIG. 3, video stills from each of two different worksites are displayed. The video stills may each be acquired from different cameras at the corresponding worksite. In one embodiment, the video stills, and corresponding video streams that are requested by the user, are received at the site monitor device 220 from the local site visibility system 110. In some embodiments, the video stills and/or corresponding video streams are received from the cloud site visibility system 230. In some embodiments, certain video streams and/or related metadata may be received from the local site visibility system 110, while other types of video streams and/or related metadata may receive from the cloud site visibility system 230.

In one embodiments, some or all of the video stills are replaced with live video streams from the corresponding cameras. For example, low-resolution video streams associated with the cameras may be displayed in the monitoring user interface 300. As discussed further below, for some cameras the low-resolution video stream may be generated by down sampling another video stream from the particular camera, while other cameras may generate a low-resolution video stream suitable for thumbnail display and rendering. In some embodiments, the monitoring interface 300 includes video stills from each of the cameras, and a user input associated with a particular video still causes the low-resolution video stream from that site to replace the video still. For example, the user may hover a pointer over image 302, or perform a particular gesture associated with image 302, to cause the video still image 302 to be replaced with a live video stream from the corresponding camera.

In the example of FIG. 3, each of the video stills may be selected to initiate display of a high-resolution video stream associated with the video still. For example, a user could select image 302 to initiate display of a high-resolution video stream in a new window, or replacing the video stills shown in FIG. 3.

The local site visibility system 110 may also communicate with the cloud site visibility system 230, such as to provide sensor data (e.g., video stream and/or other sensor data) for further analysis, such as to determine whether triggered alerts are accurate and to generate updated models for triggering such alerts.

In the example of FIG. 2, the local site visibility system 110 includes a camera discovery component 203 that is configured to discover newly installed cameras on a network, such as cameras installed/added at a business site. The camera discovery component 203 may periodically scan the network 160 (e.g., a local area network and/or remote networks, such as other networks associated with an entity) for new cameras using multiple camera protocols, such as queries for AXIS cameras, running Nmap to find hosts with open RTSP ports, port 80 scans to find HTTP interfaces, and/or other processes to identify cameras connected to the network. For potential cameras where a MAC address may be identified (e.g., cameras or other devices on the network that have MAC addresses), the MAC address can be looked up in a database of camera MAC addresses to identify the particular camera manufacturer, model, and/or characteristics.

For each located camera, the camera discovery component 203 is configured to automatically attempt authentication, starting with a series of known authentication credentials (e.g., combinations of usernames and passwords) for the particular camera type (and/or other camera characteristics) that were acquired over time from multiple sites. When authenticated, a still image from the camera and capabilities of camera may be retrieved, including channels (e.g., URLs) for different video and audio streams provided by the camera. Additionally, video stream capabilities of each camera may be identified and, based on the capabilities, a determination may be made as to whether any additional video steams need to be created for particular cameras.

Figure 5:
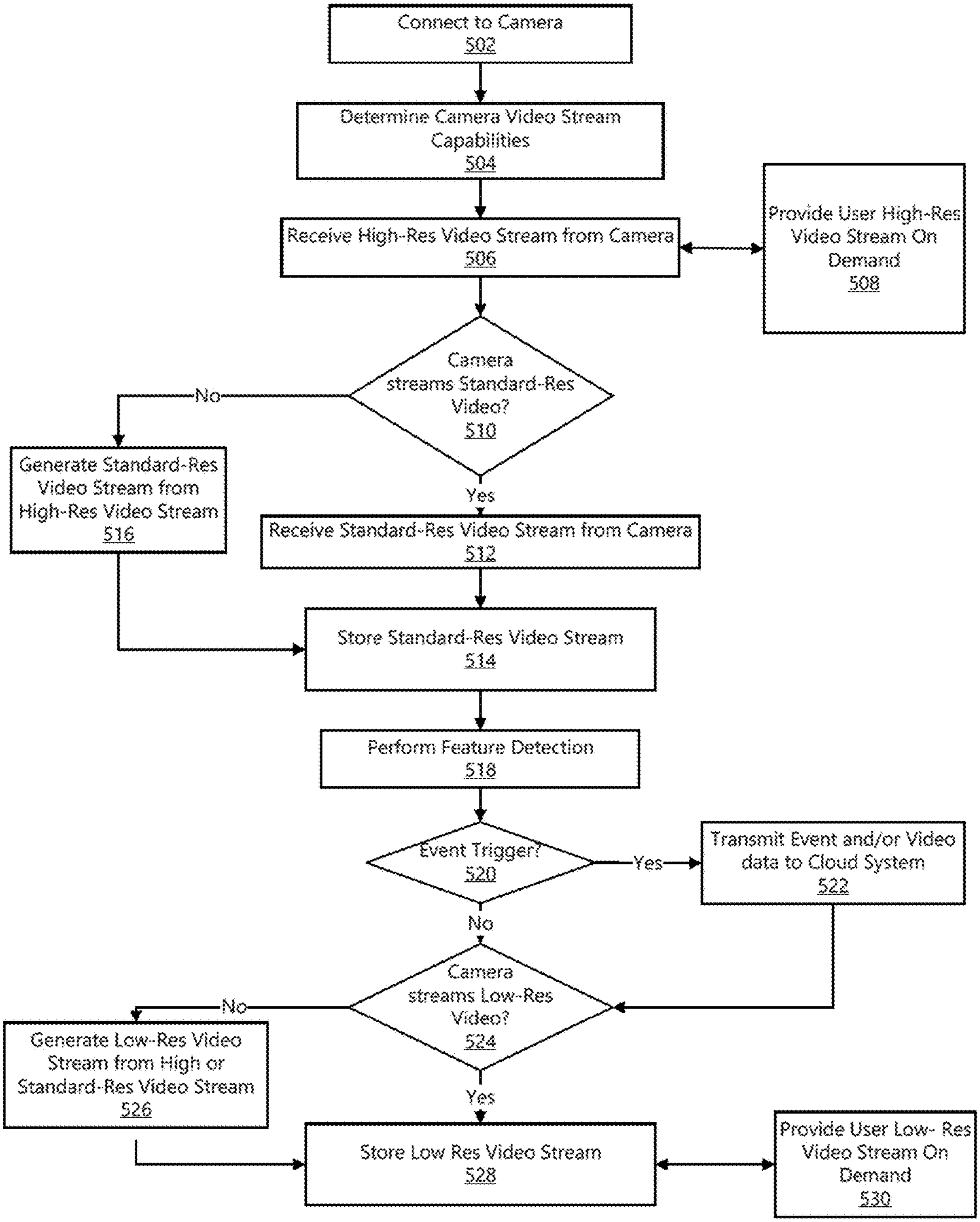
FIG. 5 is a flowchart illustrating an example of one embodiment of a process that may be performed by a local site visibility system.

In the example embodiment of FIG. 2, the local site visibility system 110 includes a sensor interface 202, which generally is any hardware and/or software components that are configured to communicate with sensors, such as the cameras 104 and the smart sensors 106 of FIG. 1. The video stream management component 204 is configured to determine video streaming capabilities of specific cameras and generate additional video streams for particular cameras, as needed. FIG. 5, discussed below, provides one example workflow that may be performed by the video stream management component 204.

The sensor data storage 210 stores video streams received from cameras 104 and/or generated by the video stream management component 204. For example, the sensor data storage 210 may be configured to store a certain rolling time period (e.g., the last 48 hours) of high-resolution and standard-resolution video data, and another longer rolling time period (e.g., the last 96 hours) of low-resolution video data. The sensor data storage 210 may include one or multiple storage devices, such as hard drives, servers, and/or server farms to facilitate storage of the sensor data. In some embodiments, certain sensor data may be offloaded from the sensor data storage 210 to a storage system associated with the cloud site visibility system 230. For example, certain snippets of video data associated with any detected event, e.g., 30 seconds before and 30 seconds after, may be stored by the cloud site visibility system 230 for some longer time (e.g., six months or longer).

The AI processing 206 generally performs feature detection on the sensor data, e.g., video data from the cameras 104 and/or other sensor data from the smart sensors 106, such as to identify events of interest. For example, an event of interest at a manufacturing facility might be to indicate that an assembly line has stopped moving for a certain period of time, such as based on analysis of the video stream from one or more cameras having the assembly line within their field of view. The AI processing component 206 may include machine learning, neural network, and/or other artificial intelligence algorithms that generate and/or update models for detection of certain events. For example, in some embodiments, users may provide feedback on accuracy of identified features and/or events. For example, a user may indicate that video data associated with a "stopped line" event that was detected by the AI processing 206 does not actually show a stopped assembly line, but rather shows a large object blocking much of the camera's view of the assembly line. With this feedback, the AI processing 206 may update and/or optimize a model for triggering a stopped line event so that similar false positive event detections occur in the future.

In some embodiments, the cloud site visibility system 230 also includes an AI processing component, which may be more robust than the AI processing 206 at the local site visibility system 110. Thus, in some embodiments, model optimization is performed at the cloud site visibility system 230, such as based on one or more video streams that are provided by the local site visibility system 110. In some embodiments, a standard-resolution video stream, which typically is generated by the local site visibility system 110 based on another resolution video stream from a camera, is used in the feature detection and other AI processing.

In some embodiments, the cloud site visibility system 230 maintains information that is used by the camera discovery component 203, such as an authentication credentials database. For example, authentication credentials associated with various characteristics of cameras (e.g., manufacturer, model, capabilities, etc.) that are obtained from multiple sites (e.g., tens, hundreds, thousands, or more sites similar to worksite 102) as cameras are authenticated at those sites. Thus, the cloud site visibility system 230 may advantageously identify authentication credentials that are most likely to be accepted for future authentication requests at other sites. In some embodiments, when the camera discovery component 203 identifies a new possible camera on the network 160, a highest ranked (or multiple of the highest rank) authentication credentials for the possible camera are obtained from the cloud site visibility system 230 for use in automatically authenticating with the new possible camera.

User communication compartment 208 is configured to communicate with one or more external devices, such as the site monitor device 220 and/or the cloud site visibility system 230. In some embodiments, the communication component 208 provides sensor data, such as low-resolution and/or high-resolution video streams from one or more cameras, to the site monitor device 220, such as at the request of the user of the site monitor device 220.

Figure 4:
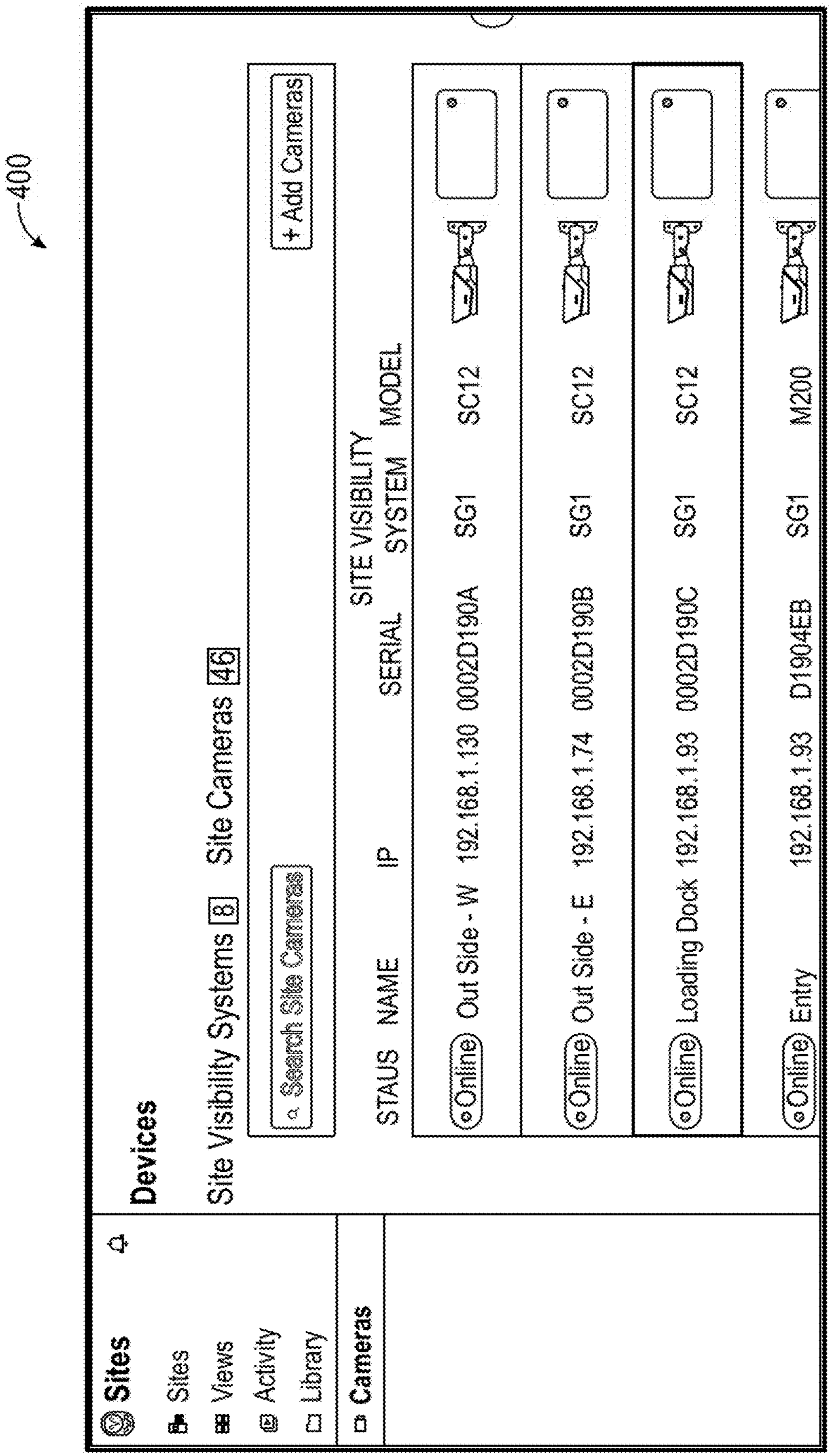
FIG. 4 is an example user interface that may be displayed on the site monitor device and/or other devices having appropriate access rights.

FIG. 4 is an example user interface that may be displayed on the site monitor device 220 and/or other devices having appropriate access rights. In this example, general information regarding each of the cameras at a site is displayed. In this example, for each camera, information including a status, camera name, IP address, serial number, site visibility system, camera model, image of the camera, and a still video image from the camera, may be displayed. The user interface 400 includes these details regarding five cameras, which are each associated with a same site visibility system (e.g., "SG1") at a particular worksite. In some implementations, a worksite may include multiple site visibility systems (e.g., local site visibility system 110) that are each in communication with a different set of sensors. For example, multiple site visibility systems, such as multiple local site visibility systems 110, may be located at a worksite and each include the same or similar components and functions. In embodiments with multiple site visibility systems, one site visibility system may be designated as a primary site visibility system that monitors and coordinates video streaming and downsampling activities performed by other site visibility systems. In the example of FIG. 4, the first three cameras are a same model ("SC12"), while the last camera is a different model ("M200"). As discussed elsewhere herein, the video stream management component 204 is advantageously configured to determine video streaming capabilities of different cameras and to determine whether any additional video streams for a particular camera should be generated.

FIG. 5 is a flowchart illustrating an example of one embodiment of a process that may be performed by a local site visibility system 110, such as by the various components of the local site visibility system 110 discussed above. In other embodiments, the method may include fewer and/or additional blocks and/or the blocks may be performed in order different than as illustrated. For ease of explanation, the process of FIG. 5 is discussed below with reference to communications with a single camera. However, the same process may be performed for each of multiple cameras in communication with the system 110, such as multiple cameras at a particular worksite.

Figure 6:
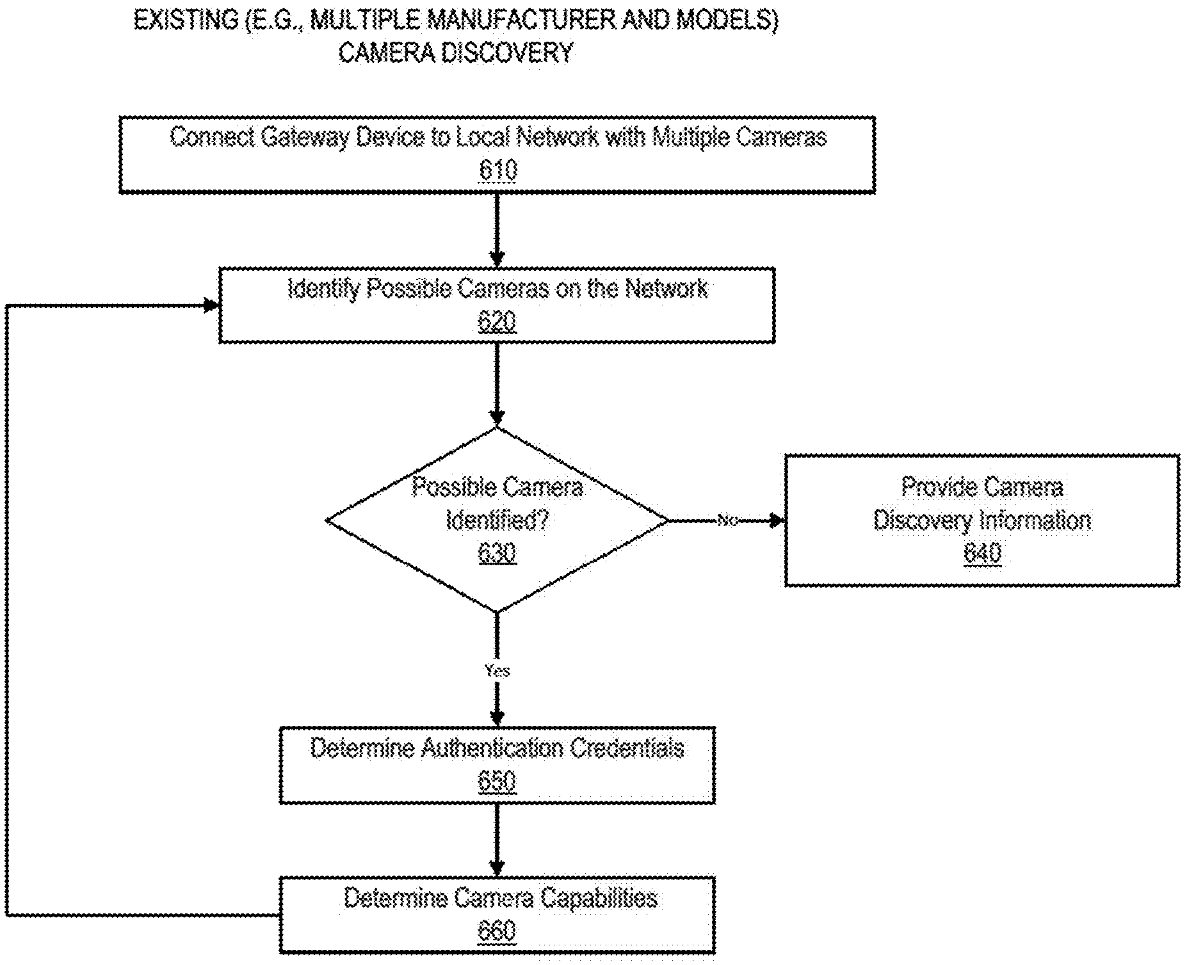
FIG. 6 is a flowchart illustrating one embodiment of an example process of discovering multiple cameras at a worksite that are already connected to a network when a site visibility system is connected.
Figure 7:
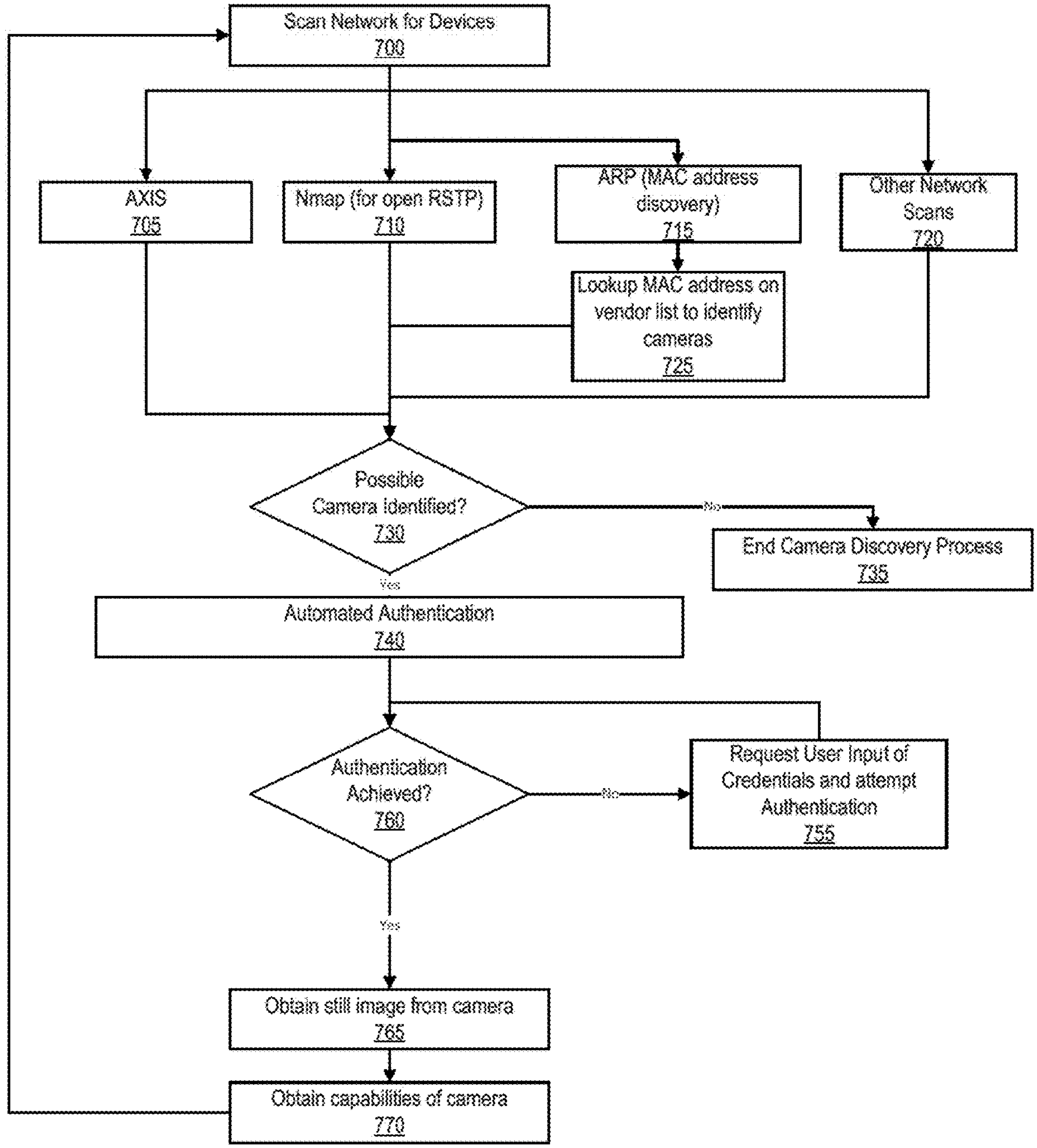
FIG. 7 is a flowchart illustrating one embodiment of an example method for discovering and establishing communication channels with cameras on a network.

Beginning at block 502, the system 110 establishes a communication channel with a camera. For example, when a camera is first powered on at a worksite, the local site visibility system 110 may be configured to establish a communication link, either wired or wireless, with the camera. FIGS. 6 and 7, discussed further below, describe example systems and methods for discovering possible cameras on a network and automatically authenticating with the identified cameras.

Next, at block 504, the system 110 determines video streaming capabilities of the camera. For example, some cameras may stream only a high-resolution video stream, while others may stream multiple video streams, such as a high-resolution and a low-resolution video stream. In some embodiments, the processes of blocks 502 and 504 are performed only a single time, such as when a new camera is added to a worksite and connected to the system 110.

Moving to block 506, a high-resolution video stream from the camera is received and provided to one or more site monitor devices 220 (at block 508), such as on-demand. In some embodiments, the high-resolution video stream may only be transmitted to the system 110 upon request for the video stream. For example, a site monitor device 220 may open a user interface for display of high-resolution video from the camera, and the system 110 may correspondingly request transmission of the high-resolution video stream from the camera. In other embodiments, the high-resolution video stream may be continuously streamed and stored, such as on the sensor data storage 210, for a particular time period and/or using a particular amount of storage space. For example, a predetermined amount of storage space may be allocated for high-resolution video streams from all of the cameras in communication with the system and/or individual high-resolution video storage limits for individual cameras.

Next, at block 510, the system accesses the camera capabilities (that were determined at block 504) to determine whether the camera streams a standard-resolution video stream. If the camera does stream a standard-resolution video stream, the process continues to block 512 where the camera transmits the standard-resolution video stream to the system, such as for storage (block 514) in the sensor data storage 210. The storage time of the standard-resolution video stream (and/or other video stream resolutions) may vary depending on the implementation. In some embodiments, the standard-resolution video stream is discarded (e.g., deleted from storage) after it has been processed, such as processed by the feature detection of block 518. In some embodiments, and as noted above with reference to storage of the high-resolution video stream, a standard-resolution video stream may be continuously streamed or streamed on-demand, and may be allocated a certain amount of storage space and/or standard-resolution video time period.

If at block 510 the system determines that the camera does not stream standard-resolution video, the method continues to block 516 where the system generates a standard-resolution video stream from the high-resolution video stream. For example, the high-resolution video stream may be downsampled to generate a standard-resolution video stream.

Once a standard-resolution video stream from the camera is received (block 512) and/or generated (block 516) at the system 110, at block 518 feature detection and/or other artificial intelligence and/or machine learning processes may be performed on the standard-resolution video stream. Advantageously, the standard-resolution video stream includes enough details regarding features to allow accurate feature detection to be performed, while not requiring as much storage space and processing time as would be required for feature detection on a high-resolution video stream. Similarly, while the standard-resolution video stream requires additional storage space than a low-resolution video stream, the level of feature detection accuracy may be greatly improved with the level of detail in the standard-resolution video stream. In other embodiments, other video streams may be used in feature detection, such as the high-resolution video stream and/or low-resolution video stream. In some embodiments, feature detection at the local site visibility system 110 may be performed using the standard-resolution video stream, and feature detection at the cloud site visibility system may be performed using high-resolution video streams, such as to detect features that may not be easily detectable in the standard-resolution version of the video stream.

Next, at block 520, the system 110 monitors the feature detection performed at block 518 for detection of an event. Depending on the embodiment, an event may be associated with one or multiple features being detected in the standard-resolution video stream. For example, a first event may be triggered only when each of two different features are detected within a certain time period, while another event may be triggered by detection of only a single feature in a single standard-resolution video frame.

If any event trigger is detected at block 520, the process continues to block 522 where information regarding the event, such as an indication of the triggering event, video data associate with the event, and/or metadata regarding the event, may be transmitted to the cloud site visibility system for further processing. For example, a cloud site visibility system may analyze the standard-resolution video stream in greater detail than the local site visibility system 110 and/or may analyze other sensor data, such as a high-resolution video stream, to determine whether the triggered event is accurate and/or to update or otherwise optimize the model and/or rules used to trigger the particular event. In some embodiments, certain events may trigger transmission of an alert to one or more users, such as a user of a site monitor device 220.

Next, at block 524, the system 110 determines whether the camera streams a low-resolution video stream. If not, the method continues to block 526, where a low-resolution video stream is generated from the high-resolution or standard-resolution video stream. Once the low-resolution video stream is either generated (block 526) or received directly from the camera (block 528) the system 110 stores portions of the low-resolution video stream. For example, low-resolution video from a predefined time period, e.g., a previous 48 hours, may be stored at the local site visibility system 110, and provided to one or more site monitor devices for viewing at block 530. In some embodiments, low-resolution video may only be accessed and stored at the system 110 upon request by a site monitor device. In some embodiments, the low-resolution video stream is transmitted to the cloud site visibility system for analysis and/or storage. For example, a local site visibility system may store a first time period of low-resolution video stream (e.g., 48 hours), while a cloud site visibility system may store a second, extended, time period of low-resolution video stream (e.g., two weeks).

Example Camera Discovery

In addition to cameras having different video streaming capabilities, such as discussed above, cameras from different manufacturers and different models have different communication protocols. Thus, particularly for an existing multi-camera arrangement at a worksite, for example, multiple models and types of cameras may be pre-existing when the site visibility system (e.g., local site visibility system 110) is installed. Establishing communications with such various cameras typically involves several manual processes of identifying cameras on the network, determining communication protocols of those cameras, and authenticating the site visibility system with the cameras so that video feeds (and/or other sensor data from the cameras) may be received. As discussed herein, a camera discovery component of a site visibility system (e.g., camera discovery component 203 of local site visibility system 110) may perform a series of automated processes for identifying cameras connected to a network (or multiple networks in some embodiments) and authenticating the site visibility system with each of the cameras, typically without user intervention.

In one embodiment, a site visibility system periodically scans the local network for new cameras using multiple camera protocols, such as queries for AXIS cameras, running Nmap to find hosts with open RTSP ports, and port 80 scans to find HTTP interfaces. Any MAC addresses identified may then be looked up in a database of camera MAC addresses to identify camera manufacturers and models. For each located camera, authentication is performed, starting with a series of known authentication credentials (e.g., combinations of usernames and passwords) for the particular camera type that are acquired over time from multiple sites, such as may be maintained by the cloud site visibility system in an authentication credentials database or other data structure. When authenticated, a still image from the camera and capabilities of the camera may be retrieved, including channels (e.g., URLs) for different video and audio streams provided by the camera.

FIG. 6 is a flowchart illustrating one embodiment of an example process of discovering multiple cameras at a worksite that are already connected to a network when a site visibility system is connected. Depending on the embodiment, the method of FIG. 6 may include fewer or additional blocks and/or the blocks may be performed in order different than as illustrated.

Beginning at block 610, the site visibility system is connected to a local network with multiple cameras already on the network. As discussed above, the cameras may be from different manufacturers and have different capabilities, including communication protocols and requirements.

Next, at block 620, the site visibility system identifies possible cameras on the network, such as by using multiple device discovery processes that are discussed below with reference to FIGS. 7 and 8, for example. At block 630 if a possible camera is identified (e.g., a device on the network that could be a camera, but could be another device connected to the network), the method continues to block 650, where the site visibility system determines authentication credentials for the possible camera, such as using a process similar to discussed below with reference to FIG. 9. With the camera authenticated, capabilities of the camera may be determined at block 660, and then the method returns to block 620 to identify additional possible cameras on the network. Once all cameras have been identified, the method continues to block 640 where information regarding the discovered cameras is provided to a user, such as via one or more user interfaces.

FIG. 7 is a flowchart illustrating one embodiment of a method for discovering and establishing communication channels with cameras on a network. In some implementations, the method of FIG. 7 may be performed by a site visibility system, such as by the camera discovery component 203 of the local site visibility system 110 in FIG. 2. In other embodiments, other devices may perform some or all of the processes discussed with reference to FIG. 7. Depending on the embodiment, the method of FIG. 7 may include fewer or additional blocks and/or the blocks may be performed in an order different than is illustrated.

Beginning at block 700, multiple processes for identifying cameras (or possible cameras) on the network are performed. For example, the site visibility system may scan a network for IP addresses, such as from a DHCP server, and then go through multiple possible communication protocols used by cameras to identify cameras on the network and establish an authenticated communication channel with the cameras. In the example of FIG. 7, establishing a communication channel with AXIS protocol devices is shown in block 705, using a Nmap hostname discovery process to identify open RSTP ports that may be associated with cameras on the network is shown in block 710, requesting MAC addresses (e.g., ONVIF) of devices on the network using ARP is shown in block 715, and other network scans that may be performed to identify and/or establish communication links with cameras on the network are shown in block 720.

In some embodiments, the ARP discovery process 715 may be followed by a MAC address lookup at block 725, such as using a database of MAC address ranges associated with particular manufacturers and/or device models. For example, certain device manufacturers may publish MAC address ranges associated with particular devices, so with the MAC address of the device identified using an ARP request, the device model may be determined. In some embodiments, the provider of the site visibility system maintains its own mapping table of MAC addresses to device types. For example, the cloud site visibility system 230 (FIG. 2) may be in communication with multiple local site visibility systems 110, such as dozens, hundreds, thousands, or more local site visibility systems at different locations throughout a city, state, country, or worldwide. Thus, the cloud site visibility system 230 may obtain information regarding camera types and capabilities that are identified at one worksite, such as manually by a user setting up the cameras, that is useful to automatically identify the same camera type at other sites. For example, if a first worksite identifies a particular manufacturer/model of camera as having a specific MAC address, the MAC address lookup table may be updated to include that MAC address associated with the particular manufacturer/model (and/or other characteristics of the camera). Then, another worksite that identifies a camera having a MAC address similar to the specific MAC address identified by the first worksite (e.g., the same first three alphanumeric characters) may preliminarily determine that the camera is the same manufacturer/model, without user intervention.

In some embodiments, a MAC address mapping table may be stored at the cloud site visibility system (and/or at the local site visibility system), and include MAC address information for hundreds, thousands, or more cameras that have been obtained from hundreds, thousands, or more different sites. Thus, when a new MAC address is identified at a particular site, that MAC address may be looked up in the MAC address mapping table to identify the likely camera manufacturer, model, etc. The lookup may be based on a predefined portion of the MAC address, such as the first three digits of the MAC address of the camera matching the first three digits of a MAC address in the mapping table. In other embodiments, other matching (e.g., based on fewer, additional, and/or different digits of the MAC address and/or fuzzy matching) may be used identify the likely camera in the MAC address mapping table. In some embodiments, the MAC address mapping table may also include information directly obtained from manufacturers of cameras and/or other sources, in addition to information obtained through discovery and authentication of cameras at the multiple sites in communication with the cloud site visibility system.

Figure 8:
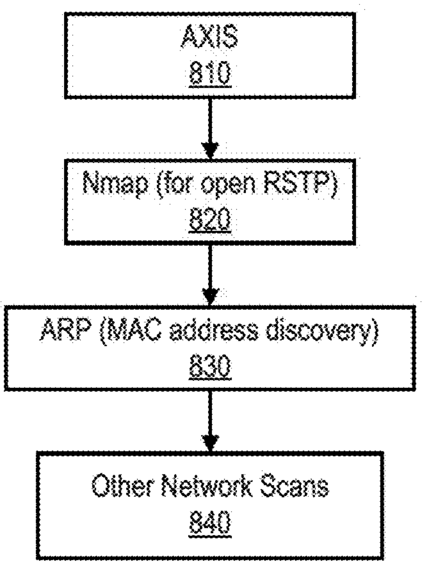
FIG. 8 is a flowchart illustrating one embodiment of an example order of performing device discovery using various communication protocols.

FIG. 8 illustrates, for example, an example order of performing device discovery using various communication protocols. In the embodiment of FIG. 8, the identification of any AXIS devices is performed initially at block 810, then an Nmap scan for open RSTP ports is performed at block 820, followed by an ARP request for MAC addresses at block 830, and then any other network scans 840 (e.g., ONVIF) may be performed. In some embodiments, after each device discovery process 810-840 is performed, if no additional potential cameras are on the network, the later network discovery processes may not be performed. For example, if after the Nmap scanning for RSTP ports is performed there are no remaining IP addresses identifiable on the network that could be cameras, the ARP scanning and other network scans may not be performed. In some embodiments, the network discovery processes may be performed in a different order than illustrated, and/or certain or all of the processes may be performed concurrently.

Returning to FIG. 7, at block 730, if a device is identified on the network using any of the processes 705-720 that may be a camera, the method continues to block 740. If, however, no additional possible cameras are identified on the network, the process continues to block 735 where the automated camera discovery process is completed. In some embodiments, information regarding the located cameras is then provided to a user, such as a site monitoring device 220 and/or a device local to the site visibility system 110. Additional cameras may then be identified manually by the user, if necessary, and information regarding those cameras may be provided to the cloud site visibility system for use by other local site visibility systems in the future.

At block 740, an automated authentication process is performed to identify credentials for communicating with the identified camera. Credentials may include a username and password and/or any other form of information that may be used to authenticate the site visibility system for communication with the located camera. In one embodiment, the automated authentication process 740 may include the example process of FIG. 9.

Figure 9:
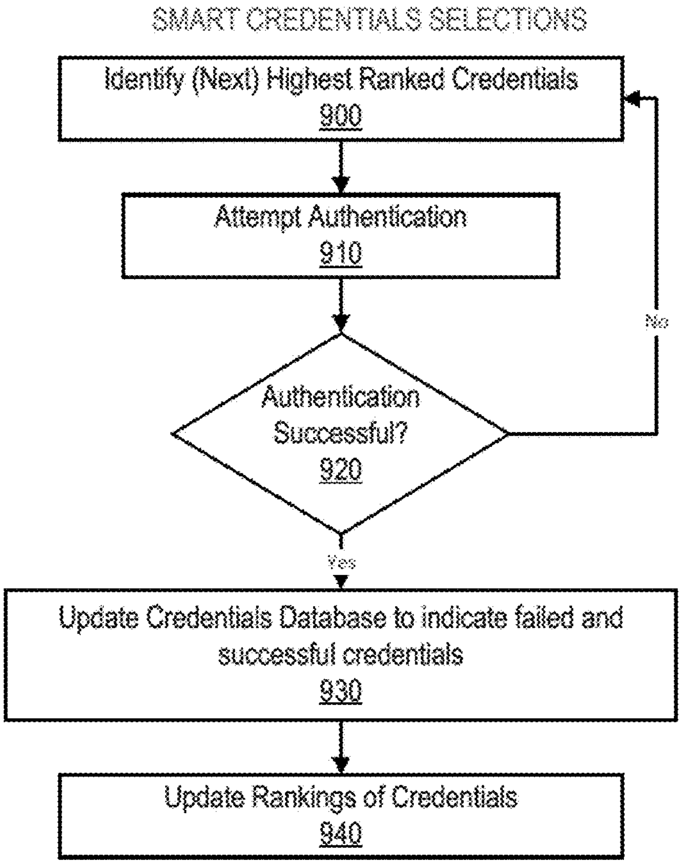
FIG. 9 is a flowchart illustrating one embodiment of an example method for identifying credentials for a camera and attempting authentication with those credentials.

FIG. 9 is a flowchart illustrating one embodiment of an example method for identifying credentials for a camera and attempting authentication with those credentials. In the embodiment of FIG. 9, the automated process is improved as credentials for various devices (e.g., combinations of manufacturer and model) are identified by the local site visibility system, as well as other site visibility systems that are in communication with the cloud site visibility system 230. In some embodiments, the smart credential selection process of FIG. 9 may be performed partially or fully by the cloud site visibility system 230. In some embodiments, the local site visibility system 110 performs the process of FIG. 9, based on a ranked listing of authentication credentials provided by the cloud site visibility system 230, for example. Depending on the embodiment, the process of FIG. 9 may include fewer or additional blocks and/or the blocks may be performed in an order different than is illustrated.

Beginning at block 900, the site visibility system identifies the highest ranked credentials, such as for the particular manufacturer and/or model of camera. For example, the site visibility system may query the cloud site visibility system with the particular manufacturer and/or model of an identified camera, and in return receive a ranked listing of credentials for that particular manufacturer and/or model of camera. In other embodiments, the local site visibility system 110 maintains a listing of some or all of the ranked credentials for certain cameras.

Next, at block 910, the highest ranked credentials are used to attempt to authenticate the site visibility system with the camera. For example, a username and password that has been successfully used to authenticate with the same manufacturer and model of camera previously by other site visibility systems may be at the top of the ranked listing.

At block 920, if authentication with the highest ranked credentials is not successful, the method returns to block 900, where the next highest credentials are selected and authentication is again attempted at block 910. If no further credentials remain for the particular manufacturer and/or model of camera, the automatic authentication process may end, and a request for a user to provide credentials for the camera may be provided, such as at block 755 of FIG. 7.

If authentication is successful at block 920, the method continues to block 930 where the authentication credentials database is updated to indicate any failed attempts and the successful authentication attempt. For example, information regarding credentials that were attempted, but were not successful in authenticating with the device, may be indicated as failed attempts, which may tend to reduce ranking of those authentication credentials for the particular camera manufacturer and/or model. Information regarding the failed and successful authentication attempts may be provided to the cloud site visibility system 230 for updating a master ranked authentication credentials listing for that particular manufacturer and model of camera.

At block 940, the rankings of credentials may be updated based on the information regarding failed and successful credentials provided at block 930. For example, if the highest ranked credentials were not successful in authenticating the device, the credentials that were successful in authenticating the device may be promoted to be the highest ranked for that particular camera, such that the successful credentials are attempted initially for future cameras of the same manufacturer and/or model. In this way, the site visibility system may maintain and dynamically update authentication credentials from multiple sites to improve the likelihood that automatic authentication of newly identified cameras is successful.

Returning to FIG. 7, once the automatic authentication has performed successful authentication with the located device (or a user has provided credentials at block 755 to authenticate with the device) at block 760, the method continues to block 765 where a still image from the camera is obtained. For example, the still image may be snapshot of the current video feed from the camera that is used in a thumbnail image associated with the camera. In some embodiments, a still image may not be obtained. In some embodiments, a video clip from the camera is obtained, such as a three second video stream that is played in the loop in a thumbnail for the camera. In some embodiments, the camera may include multiple lenses (e.g., a quad cam includes four cameras) and associated video feeds. In such an embodiment, at block 765 a still image from each of the lenses may be acquired.

Next, at block 770, capabilities of the camera may be obtained. For example, video streaming capabilities of the camera may be determined by querying the camera for such capabilities.

Figure 10:
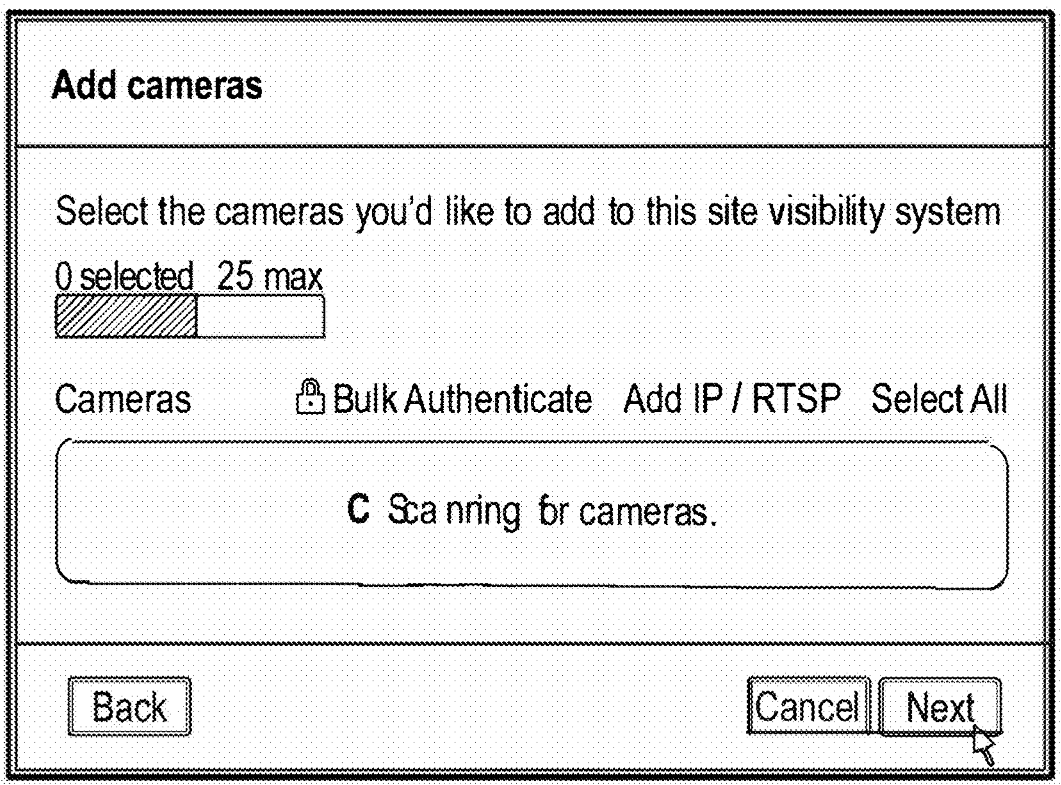
FIG. 10 is an example user interface that indicates a device discovery process has begun, such as when the process of FIG. 7 has started.
Figure 11:
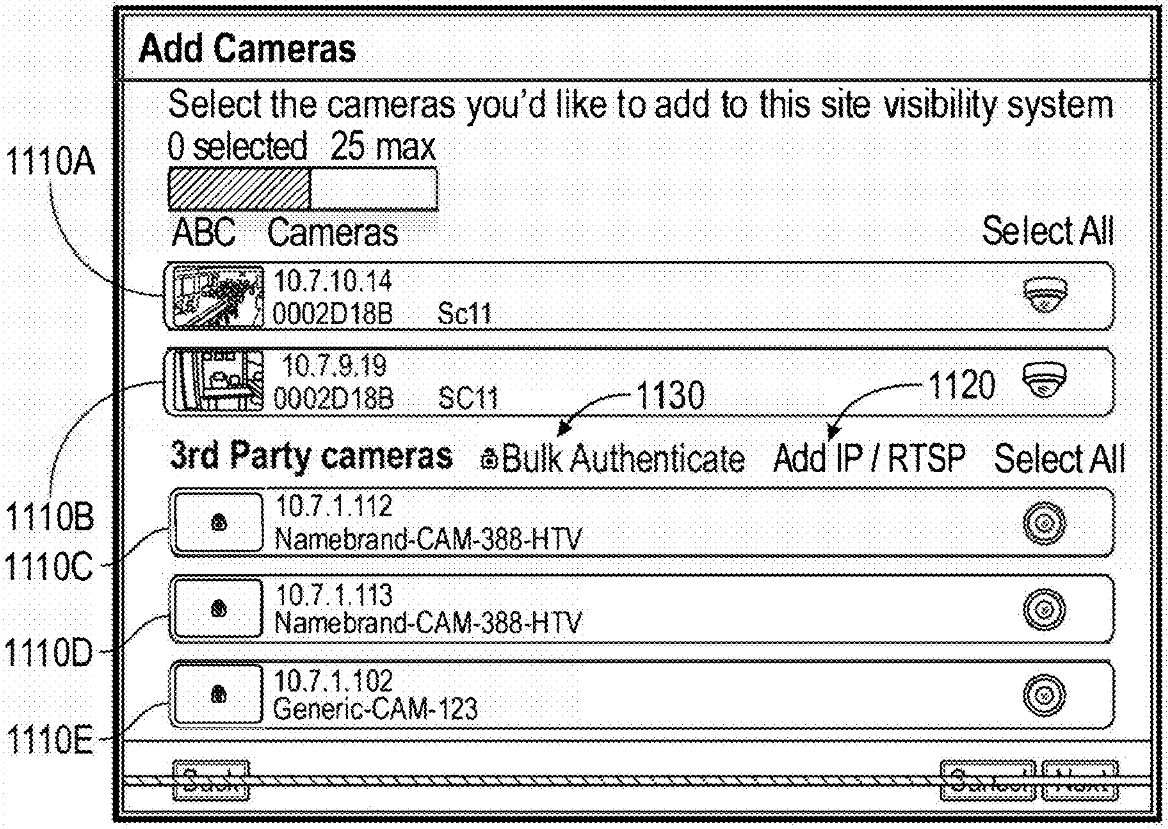
FIG. 11 is the example user interface of FIG. 10, updated to indicate cameras that have been identified on the network.

FIGS. 10-11 are example user interfaces that may be provided to a user device as part of a device discovery and registration process. For example, a device local to the site visibility system 110, such as a device in direct wired or wireless communication with the site visibility system, may be provided with similar user interfaces as part of the device discovery process. FIG. 10 illustrates, for example, a user interface that indicates a device discovery process has begun, such as when the process of FIG. 7 has started. FIG. 11 illustrates the same user interface, now updated with cameras that have been identified on the network. In this example, cameras 1110A and 1110B are cameras manufactured by the provider of the site visibility system, and so capabilities of those cameras are easily identifiable. The listed cameras also include cameras from a name brand manufacturer 1110C and 1110D, and a generic camera 1110E for which a manufacturer is not known. In this example, a bulk authenticate button 1130 may be selected to perform automated authentication of all of the identified cameras, such as by performing the process of FIG. 9. In some embodiments, the bulk authentication is an automated process that is performed as the cameras are located using the various communication protocols. The user may select an add IP/RTSP button 1120 to manually add information regarding a camera that may have not been detected by the automatic camera discovery processes.

Management of Cameras

As discussed above, a site visibility system (e.g., a gateway device) may be in communication with a backend server. The site visibility system may receive sensor data from a plurality of cameras associated with a physical asset (e.g., a vehicle, equipment, etc.), an environment (e.g., a site, a room, a building, a natural environment, etc.), etc. For example, the cameras may be dispersed throughout an environment (e.g., a building) to generate sensor data associated with particular features of the environment (e.g., different floors, different rooms, etc.). In another example, all or a portion of the cameras may be associated with physical assets such as vehicles (e.g., automobiles, trailers, refrigerated trailers, refrigerated vehicles (e.g., box trucks, etc.)), equipment (e.g., generators, cameras, motors, tools, physical apparatuses, etc.), or any other assets and a particular camera may monitor a particular asset. It will be understood that while the disclosure may reference a vehicle, a trailer, a camera, a motor, a room, a building, or any other particular asset, environment, etc., the cameras can generate sensor data associated with any asset, environment, etc.

Managing the cameras deployed within a particular environment (e.g., to monitor a particular asset within the environment) can be important. For example, users may deploy a plurality of cameras for a plurality of environments, a plurality of assets, etc. The cameras may generate sensor data associated with the monitored environments, assets, etc. based on parameters. The parameters may include any parameters related to operation and/or functionality of the camera (e.g., related to how the camera generates sensor data, how a user logins to the camera, how and/or what data is output by the camera, etc.), For example, the parameters of the camera may include a bit rate, a frame rate, a resolution, a password, a zoom level, a flip status, a rotate status, a mirror status, a brightness, a contrast, a saturation, a sharpness, or an internet protocol settings. The parameters may be system-provided parameters. For example, the camera may be pre-configured with various parameters (e.g., a default brightness, a default contrast, etc.). In some cases, a user may provide the parameters and configure the cameras to generate sensor data based on user-provided parameters. For example, the user may, via a user computing device, adjust the parameters of the camera(s).

Each of the cameras may be associated with camera identification data. For example, the camera identification data may indicate a camera type of the camera. The type of the camera may include a manufacturer and/or brand (e.g., Acme, Generic Camera, etc.), a model (e.g., a particular model or type), capabilities (e.g., video streaming capabilities), a software version (e.g., version 1.0, version 1.1, etc.), an update status (e.g., updated, not updated, etc.), etc. of the camera.

The parameters of the camera may be based on the camera identification data. For example, a particular parameter (e.g., a maximum bitrate) may not be reported by a first camera of a first camera type and/or adjustable for the first camera and the particular parameter may be reported by a second camera of a second type of camera and/or adjustable for the second camera. For example, the particular parameter may be unalterable for the first camera and customizable for the second camera.

Further, the process of adjusting the parameters of the camera may be based on the camera identification data. For example, a particular parameter may be adjusted for a first camera of a first camera type using a first process of parameter adjusting (e.g., particular code, a particular interface, a particular system, etc.) and the particular parameter may be adjusted for a second camera of a second camera type of camera using a second process of parameter adjusting (e.g., different code, a different interface, a different system, etc.).

As each of the cameras may be associated with different camera identification data (e.g., the cameras may be different types of cameras), it may be difficult to manage the cameras in a uniform manner as a result of the difference in parameters that may be adjustable and/or available and/or the difference in processes of parameter adjusting for all or a portion of the cameras. Further, managing the cameras to adjust the sensor data generated by the cameras and provided to the user via a computing device may be difficult given the different parameters and/or the different processes of parameter adjusting for each of the cameras.

Further, as the number of deployed cameras may be large (e.g., 100, 1,000, etc. deployed cameras), it may be difficult to manage the cameras. In some cases, all or a portion of the physical assets and/or environments may include a plurality of cameras. Therefore, managing the cameras associated with a particular physical asset and/or environment may also be difficult.

The user (or a separate system) may utilize the sensor data generated by the cameras to identify features (e.g., features within an environment). It may be important that the sensor data correctly identify a particular feature. A user may utilize the sensor data to identify a user, a physical asset, an incident, or event. For example, a user may utilize the sensor data to identify the presence of a particular user within an environment. In some cases, a system may verify the occurrence of an incident or event and/or identify a source of the incident or event by reviewing the sensor data. For example, the incident or event may be a security event (e.g., a breach of a secured environment by a third party), an abnormal event (e.g., a system failure), a maintenance event (e.g., performance of a maintenance event), etc. Further, the sensor data can be used to perform and/or schedule maintenance or other operations. For example, a camera may indicate that an oil level of the physical asset is low and may be indicative of a need to change the oil. However, because managing the camera may be difficult, one or more parameters of the camera may be misadjusted or may not be adjusted causing the user and/or the system to misidentify a feature (e.g., due to a brightness associated with the sensor data being too low). Further, because managing the camera may be an extensive process due to the different parameters and/or the different processes of parameter adjusting for each of the cameras, the camera may not be adjusted in an efficient manner and the camera may not generate sensor data identifying the feature.

In some cases, traditional camera control systems may utilize multiple different systems, interfaces, code languages, etc. to control cameras whereas the camera control system as described below may utilize a uniform system to generate translated operations that are particular to the particular camera. For example, the camera control system may translate uniform operations based on the particular camera to which the translated operation is to be provided.

Further, in traditional camera control systems, when a user attempts to manage a particular camera, the camera may require input in a particular code language. Therefore, management of a particular camera may require knowledge of a particular code language. Users without knowledge of the particular code language may be unable to manage the particular camera. Further, given the different parameters and/or the different processes for adjusting the parameters for each of the cameras, management of a plurality of cameras may require knowledge of a plurality of code languages. Users without knowledge of each of the plurality of code languages may be unable to manage the plurality of cameras. Further, traditional camera control systems may be limited to controlling cameras using a textual input in a particular format. Further, each camera may define parameters in a particular format. As discussed above, traditional camera control systems may be limited to identifying and executing operations that are defined using a textual input in a particular format or code language and/or textual input defined via a particular system or interface. The use and management of a particular camera may require extensive training on the code language associated with the camera, the format of the parameters of the camera, the process for managing the parameters, etc. Further, as the number of cameras and the number of code languages may be quite large, it may be difficult and inefficient to manage each of a plurality of cameras. As the camera control system may not recognize operations that are not provided in the code language (or are not defined correctly using the code language), management of the cameras may be inefficient. Therefore, it may not be possible for a user of a traditional camera control system, without experience in a particular code language associated with the camera and/or experience in the format of parameters of the camera, to manage the camera.

Additionally, due to the time consuming and inefficient process to manage the plurality of cameras, it can be time consuming and inefficient to identify camera identification data associated with a plurality of cameras. Specifically, traditional systems may be unable to efficiently manage the plurality of cameras to generate particular sensor data identifying a particular feature. Therefore, just processing the sensor data to identify the occurrence of a particular feature by traditional systems can be an issue.

As mentioned above, according to various embodiments of the present disclosure, an improved system can include site visibility systems that route sensor data to the system (e.g., a backend server such as the management server system). Each site visibility system may be attached (e.g., via a wireless or wired connection) to one or more cameras. The site visibility system can obtain sensor data generated by the one or more cameras. The one or more cameras may generate image data associated with a particular physical asset, environment, etc. For example, the one or more cameras may generate image data associated with a particular building, room, hallway, door, exit, etc.

In some embodiments, the system may obtain sensor data from sensors other than cameras and manage the sensors as described below. For example, the system may obtain sensor data from image sensors (e.g., lidar sensors, radar sensors, etc.) and manage the image sensors. In another example, the system may obtain sensor data from and manage one or more sensors that may include an audio sensor, a temperature sensor, a lock sensor, a humidity sensor, a cargo monitor sensor, a latch sensor, a door monitor sensor, or any component monitoring sensor to monitor a physical asset, environment, etc.

Each of the plurality of cameras may transmit sensor data to the site visibility system. The plurality of cameras may transmit the sensor data to the site visibility system via a first network. For example, the plurality of cameras may transmit the sensor data to the site visibility system via a local area network or a personal area network. In some cases, the plurality of cameras may transmit the sensor data to the site visibility system via a Bluetooth connection. Each of a plurality of site visibility systems can transmit obtained sensor data to a management server system. In some embodiments, the site visibility system and/or the management server system may implement a machine learning model trained to identify the occurrence of a particular feature within received sensor data and/or to identify an event based on the occurrence of the particular feature. The management server system may receive sensor data from a plurality of site visibility systems. For example, the management server system may receive sensor data from one or more site visibility systems associated with a first environment, one or more site visibility systems associated with a second environment, etc. Therefore, the management server system may receive a large amount of data (e.g., in real time) at a high frequency from the plurality of site visibility systems.

To enable an improved camera management process, the management server system can cause display of a first user interface that may identify one or more cameras and one or more operations to be performed by at least one of the one or more cameras. The first user interface may include a visualization for all or a portion of the cameras monitoring a given environment, a plurality of environments, a given asset, a plurality or fleet of assets, etc. Further, the first user interface may include a visualization for all or a portion of the operations performable by at least one of the cameras. The operations may be uniform operations that are generic to the cameras (e.g., a zoom operation, an adjust brightness operation, a change password operation, etc.)

To identify the uniform operations, the management server system may obtain the uniform operations from a user and/or from a separate system. In some cases, the management server system may generate the uniform operations. For example, the management server systems may obtain camera operation data that is camera-specific and associated with one or more cameras. The management server system may utilize the camera operation data to identify operations performable by the one or more cameras. Based on the operations performable by the one or more cameras, the management server system may map the camera specific operations to one or more uniform operations (e.g., non-camera-specific operations) that are generic across the one or more cameras.

The management server system may obtain user input via the first user interface. The user input may identify one or more cameras and one or more operations to be performed by the one or more cameras. Based on the user input, the management server system may identify the one or more cameras and camera identification data associated with the one or more cameras. The camera identification data may indicate a camera type of the camera. For example, the camera type may include at least one of a camera model, a camera manufacturer, a camera interface, a camera code language, a camera brand, an update status, camera software, camera hardware, camera capabilities, etc. of the camera. In some cases, the management server system may identify the camera identification data by parsing (e.g., filtering) a camera identification data table to identify a subset of camera identification data associated with all or a portion of the one or more cameras.

To identify one or more camera operations to cause the one or more cameras to perform one or more actions corresponding to the one or more operations, the management server system may access a lookup table (e.g., a translation table). For example, the management server system may access the lookup table stored in a data store. The lookup table may link a plurality of uniform operations to a plurality of camera operations via one or more manners of translating the uniform operations for different subsets of camera identification data. For example, all or a portion of the manners of translating may indicate a manner of translating a uniform operation to generate a camera operation for a particular subset of camera identification data. In some cases, the lookup table may not identify manners of translating the uniform operations, instead, the lookup table may directly identify links between a uniform operation and a camera operation for subsets of camera identification data. For example, the lookup table may identify the camera operation (e.g., a particular command(s)) to cause a particular type of camera to perform an action corresponding to a uniform zoom operation.

The management server system may identify the correlation between the uniform operations and the camera operation data. To identify the correlation, the management server system may obtain translation data. The translation data may identify a manner of translating the uniform operations to generate the operations performable by the camera.

In some cases, the management server system may generate the translation data. For example, the management server system may route an operation to the camera and determine an action performed by the camera in response to the operation (e.g., a zoom action is performed). For example, the management server system may analyze sensor data generated by the camera in response to the operation to determine an action performed by the camera. The management server system may link a uniform operation corresponding to the action (e.g., a uniform zoom operation) to the operation and may generate translation data identifying a manner of translating the uniform operation to generate the operation. Therefore, the management server system may generate the translation data.

Based on the lookup table, the management server system may translate operations for particular cameras. For example, the management server system may generate different translated operations for one or more cameras. Further, the management server system may generate different translated operations for one or more cameras that cause the one or more cameras to perform the same action. In some cases, a first translated operation may cause a first camera to perform the action and a second translated operation may cause a second camera to perform the action but may not cause the first camera to perform the action.

The management server system may provide all or a portion of the translated operations to a site visibility system. For example, the management server system may provide the translated operations to a site visibility system associated with all or a portion of the cameras. The site visibility system may provide the translated operations to the cameras. In some cases, the management server system may provide all or a portion of the translated operation directly to one or more cameras.

Based on obtaining the translated operations, the cameras may perform one or more actions. The management server system may obtain, from the one or more cameras, via the site visibility system, a response indicating a status of the one or more actions. For example, the status may indicate the action has been performed, will be performed, is in progress, etc. The management server system may cause display of a second user interface identifying the status (e.g., for review by a user).

Example User Interfaces for Managing Cameras

Figure 12:
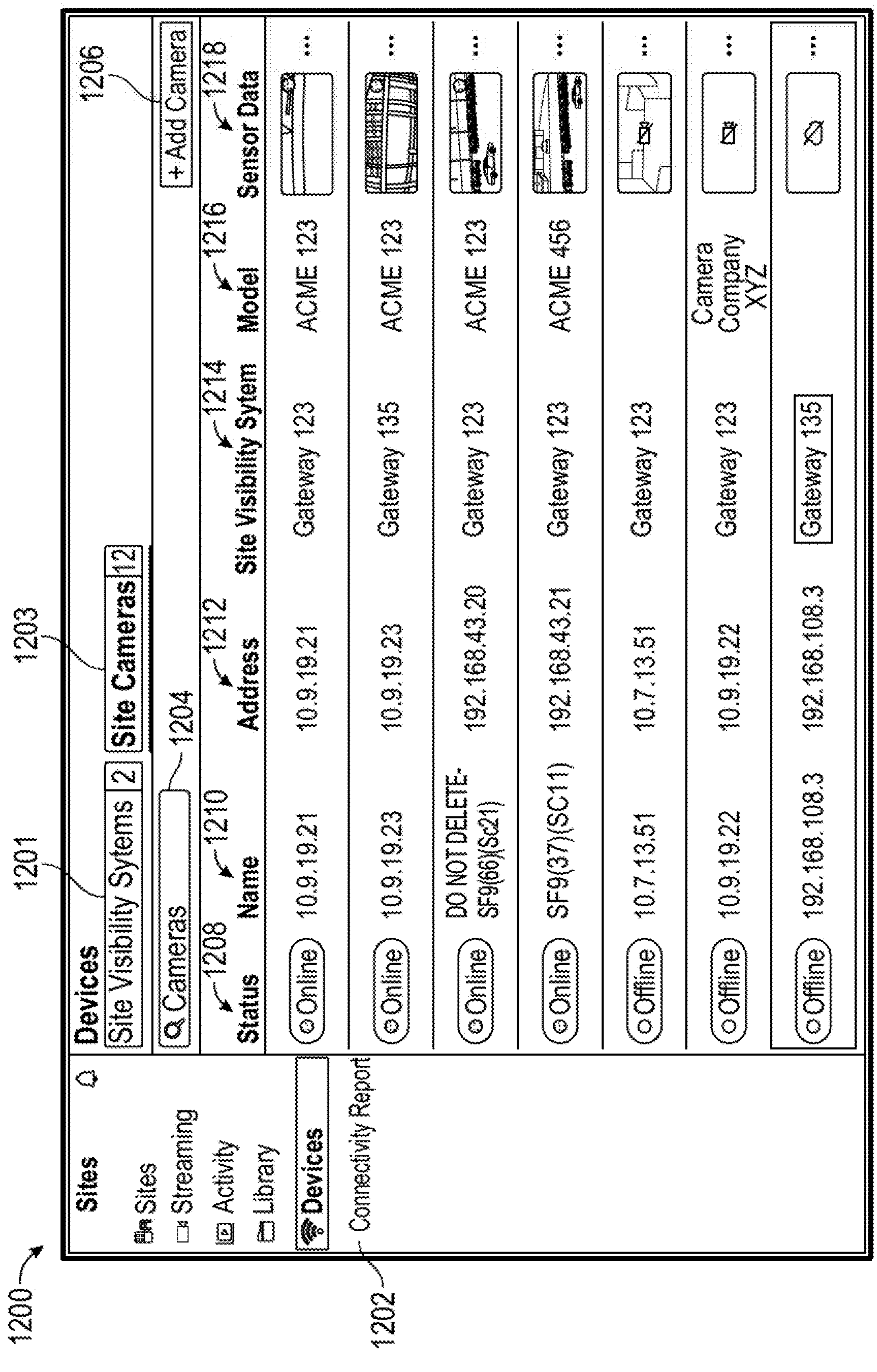
FIG. 12 is an example user interface to identify a plurality of cameras.
Figure 13:
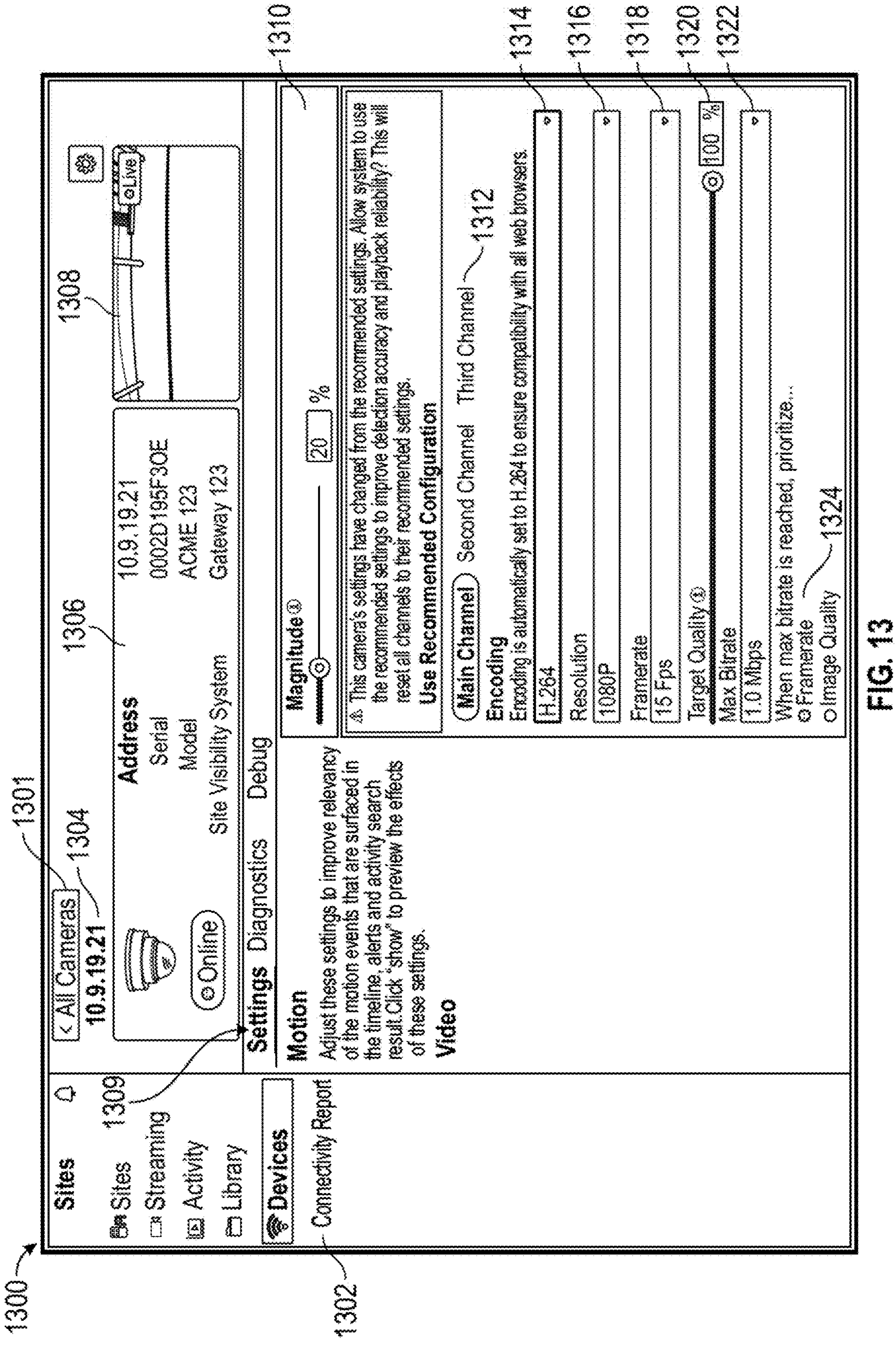
FIG. 13 is an example user interface to define operations to be performed by a camera

FIGS. 12 and 13 illustrate example interactive graphical user interfaces related to managing cameras via a site visibility system, according to various embodiments of the present disclosure. The interactive graphical user interfaces of FIGS. 12 and 13 may be provided by a management server system, and may be accessible via user device(s). In general, the management server system may obtain an input via a user interface identifying a uniform operation and a camera to perform a corresponding action and may translate the uniform operation to cause the camera to perform the corresponding action as described herein. In some embodiments, the graphical user interfaces provided by the management server system may be specific to an organization, and may include information from multiple site visibility systems associated with the organization. It will be understood that while the graphical user interfaces of FIGS. 12 and 13 reference an implementation with respect to a particular site visibility system and a particular environment, the graphical user interfaces may be implemented with respect to any physical asset, environment, etc. and any number of site visibility systems.

FIG. 12 illustrates an example interactive graphical user interface 1200 for providing visualizations of cameras and associated camera identification data. The example interface 1200 is illustrative of an improved, customized interface that the management server system generates and presents to a user via a user computing device. For example, the management server system may generate and present the example interface 1200 to a user based on the user registering, via the user computing device, one or more site visibility systems.

In the example of FIG. 12, the example interface 1200 includes a visualization of a virtual representation of all or a portion of cameras in a plurality of cameras. The visualization may include a representation of all or a portion of the site visibility systems, the cameras, the environments, the physical assets (e.g., vehicles), etc. associated with a particular user and/or organization. The example interface 1200 includes a plurality of virtual representations (e.g., each row of the example interface 1200 including a virtual representation of a particular camera). Further, the plurality of virtual representations include data identifying the particular cameras (e.g., each row of the example interface 1200 includes data associated with a particular camera). The plurality of virtual representations may include data identifying characteristics of the cameras. Further, the plurality of virtual representations identify camera identification data associated with each camera (e.g., an image frame). To generate the virtual representations, the management server system may identify the site visibility systems, the cameras, the environments, the physical assets (e.g., vehicles), etc. associated with the particular user and/or organization and corresponding camera identification data and/or characteristics associated with the cameras. In some cases, the management server system may identify the site visibility systems, the cameras, the environments, the physical assets (e.g., vehicles), etc. that are active (e.g., online, connected to a network, etc.).

The example interface 1200 may include an overview area 1202, a site visibility system area 1201, and a camera area 1203. The site visibility system area 1201 may identify one or more site visibility systems and related site visibility system identification data associated with the one or more site visibility systems. The camera area 1203 may identify one or more cameras and related camera identification data associated with the one or more cameras. All or a portion of the overview area 1202, the site visibility system area 1201, and/or the camera area 1203 may correspond to a drop-down menu, a search bar, or an interactive parameter. The example interface 1200 may identify a plurality of virtual representations identifying a plurality of cameras and/or a plurality of site visibility systems.

The site visibility system area 1201 and/or the camera area 1203 may enable a user, via a user computing device, to generate a selection and provide the selection to the management server system to filter the site visibility systems and/or the cameras. For example, a user may interact with a component of the site visibility system area 1201 to select a particular site visibility system and/or may interact with a component of the camera area 1203 to select a particular camera. Further, the site visibility system area 1201 and/or the camera area 1203 may enable users to provide a filter to the management server system and cause the management server system to filter the cameras and/or the site visibility systems. Further, the site visibility system area 1201 and/or the camera area 1203 may enable users to provide data identifying additional cameras and/or site visibility systems to be added to a fleet, an environment, etc.

The overview area 1202 may enable the user to select one or more environments, one or more assets and/or one or more fleets of assets, one or more site visibility systems, one or more cameras, etc. Further, the overview area 1202 may enable the user to identify historical data associated with one or more cameras and/or one or more site visibility systems, saved data associated with the one or more cameras and/or the one or more site visibility systems, streaming data associated with the one or more cameras and/or the one or more site visibility systems, etc. In some cases, the overview area 1202 may identify a connection status (e.g., a connection to another component, a network, etc.) of one or more cameras, one or more site visibility systems, one or more assets, and/or one or more other components.

In the example of FIG. 12, the camera area 1203 identifies a plurality of virtual representations includes a first virtual representation of a first camera, a second virtual representation of a second camera, a third virtual representation of a third camera, a fourth virtual representation of a fourth camera, a fifth virtual representation of a fifth camera, a sixth virtual representation of a sixth camera, and a seventh virtual representation of a seventh camera. It will be understood that the example interface 1200 may include more, less, or different virtual representations.

For each of the virtual representations, the example interface 1200 may identify camera identification data associated with each of the cameras. For example, the camera identification data may include camera type data. The camera type data may include camera interface data, camera update status data, camera brand data, camera software data, camera hardware data, camera hardware component data, camera code language data, camera manufacturer data, camera status data, camera name data, camera address data (e.g., IP address data), site visibility system data, model data (e.g., camera model data), sensor data, etc. associated with the particular camera.

In the example of FIG. 12, the example interface 1200 identifies camera identification data including status data 1208, name data 1210, address data 1212, site visibility system data 1214, model data 1216, and sensor data 1218 associated with all or a portion of the cameras. In the example of FIG. 12, the status data 1208 indicates that the first camera, the second camera, the third camera, and the fourth camera are associated with the status: "Online" and the fifth camera, the sixth camera, and the seventh camera are associated with the status: "Offline." Further, the name data 1210 indicates that the first camera is associated with the name: "10.9.19.21," the second camera is associated with the name: "10.9.19.23," the third camera is associated with the name: "DO NOT DELETE-SF9 (66) (SC21)," the fourth camera is associated with the name: "SF9 (37) (SC11)," the fifth camera is associated with the name: "10.7.13.51," the sixth camera is associated with the name: "10.9.19.22," and the seventh camera is associated with the name: "192.168.108.3." The address data 1212 indicates that the first camera is associated with the address: "10.9.19.21," the second camera is associated with the address: "10.9.19.23," the third camera is associated with the address: "192.168.43.20," the fourth camera is associated with the address: "192.168.43.21," the fifth camera is associated with the address: "10.7.13.51," the sixth camera is associated with the address: "10.9.19.22," and the seventh camera is associated with the address: "192.168.108.3." The site visibility system data 1214 indicates that the first camera, the third camera, the fourth camera, the fifth camera, and the sixth camera are associated with site visibility system: "Gateway 123" and the second camera and the seventh camera are associated with site visibility system: "Gateway 135." The model data 1216 indicates that the first camera, the second camera, and the third camera, are associated with the model: "ACME 123," the fourth camera is associated with the model: "ACME 456," the sixth camera is associated with the model: "Camera Company XYZ," and the fifth camera and the seventh camera are not associated with model data. The sensor data 1218 indicates a subset of sensor data (e.g., an image frame, video data, etc.) associated with the first camera, the second camera, the third camera, the fourth camera, the fifth camera, the sixth camera, and the seventh camera. Though not shown in FIG. 12, it will be understood that the site visibility system area 1201 may identify one or more virtual representations of site visibility systems.

The camera area 1203 includes a first area 1204 and a second area 1206. The first area 1204 and/or the second area 1206 may correspond to a drop-down menu, a search bar, or an interactive parameter. For example, a user may interact with the first area 1204, via a user interface, to define a filter. In response to input received via an interaction with the first area 1204, the management server system may filter and/or parse a plurality of cameras to identify a subset of the cameras. Further, a user may interact with the second area 1206, via the user interface, to define a camera to be added to the plurality of cameras. For example, the user may interact with the second area 1206 to define a status, a name, an address, a site visibility system, a model, etc. associated with the camera to be added. In some cases, the status, the name, the address, the site visibility system, the model, etc. may be based on a connection established between the camera and a site visibility system and/or the management server system.

FIG. 13 illustrates an example interactive graphical user interface 1300 for providing an additional visualization of camera identification data associated with one or more cameras. Further, the example interface 1300 provides an interface to enable a user to select uniform operations to cause a particular camera to perform a corresponding action. The example interface 1300 is illustrative of an improved, customized interface that the management server system generates and presents to a user via a user computing device. As discussed above, the management server system may generate and present the example interface 1300 to a user based on the user interacting with a particular visualization to request adjustment to one or more parameters of the camera.

In the example of FIG. 13, the example interface 1300 includes a visualization of a virtual representation of a particular camera of a plurality of cameras. The example interface 1300 includes a virtual representation of the camera that includes data identifying various characteristics of the associated camera based on the camera identification data. To generate the visualization, the management server system may identify a particular camera (e.g., a camera selected by a user via an interaction with the user interface) and may identify camera identification data associated with the camera. In some cases, the management server system may access a data store, a camera identification data table, etc. to identify camera identification data associated with the camera. In other cases, the management server system may obtain the camera identification data from a separate device and/or system (e.g., a user computing device, the camera, etc.). For example, the management server system may ping the camera to identify camera identification data associated with the camera. In some cases, the management server system may identify one or more specifications of the camera (e.g., via a website) and parse the one or more specifications to identify the camera identification data.

The example interface 1300 can include a plurality of sets of camera identification data associated with the particular camera. The example interface 1300 may include a plurality of sets of camera identification data that have been processed (e.g., aggregated, filtered, etc.) into a particular format by the management server system. Specifically, the management server system may process camera identification data to identify a particular subset of the camera identification data to provide to a user via the user interface. For example, the management server system may not provide camera identification data identifying a color or date of purchase of the camera but may provide camera identification data identifying a camera model of the camera.

In the example of FIG. 13, the camera identification data includes address data, serial data (e.g., serial number data), model data, site visibility system data, and sensor data associated with the particular camera.

The example interface 1300 may include an interactive element 1301. For example, a user may interact with the interactive element 1301 to cause display of an additional user interface (e.g., the user interface 1200 as shown in FIG. 12). Specifically, the user may interact with the interactive element 1301 to cause display of a user interface displaying additional camera identification data associated with the camera.

The example interface 1300 may include a first area 1302, a second area that includes a first section 1304, a second section 1306, and a third section 1308, and a third area 1309. The first area 1302 may be an overview area as discussed above. The first area 1302 may enable the user to select one or more environments, one or more assets and/or one or more fleet of assets, one or more site visibility systems, one or more cameras, etc. Further, the overview area 1202 may enable the user to identify historical data, save data, streaming data, etc. associated with one or more cameras and/or one or more site visibility systems. In some cases, the overview area 1202 may identify a connection status of one or more cameras, one or more site visibility systems, one or more assets, and/or one or more other components.

The second area may be a camera area as discussed above. Specifically, the second area may be a camera area associated with a particular camera. The second area may identify the camera (e.g., the selected camera) and related camera identification data associated with the camera.

The third area 1309 may enable the user to manage the camera. The third area 1309 may enable the user to select one or more uniform operations to adjust parameters of the camera. The parameters may include any parameters related to operation and/or functionality of the camera (e.g., related to how the camera generates sensor data, how a user logins to the camera, how and/or what data is output by the camera, etc.), For example, the parameters of the camera may include a bit rate, a frame rate, a resolution, a password, a zoom level, a flip status, a rotate status, a mirror status, a brightness, a contrast, a saturation, a sharpness, or an internet protocol settings.

The one or more uniform operations may include any operations to adjust parameters of the camera. For example, the one or more uniform operations may include a bit rate adjustment, a frame rate adjustment, a resolution adjustment, a password adjustment, a zoom operation, a flip operation, a rotate operation, a mirror operation, a brightness operation, a contrast operation, a saturation operation, a sharpness operation, or an internet protocol settings adjustment. Further, the third area 1309 may enable the user to adjust parameter values of the camera. For example, the third area 1309 may enable the user to adjust a resolution parameter from 640 pixels to 1080 pixels. The third area 1309 may identify the same uniform operations for multiple cameras that are associated with different camera identification data (e.g., different camera types).

The third area 1309 may include an interactive element. For example, a user may interact with the third area 1309 to select and/or define uniform operations. Further, the user may interact with the interactive element of the third area 1309 to preview the action performed by the camera in response to the selection and/or defining of uniform operations. In some cases, the third area 1309 may include an additional interactive element to enable users to verify that the uniform operations caused the camera to perform the particular action.

In the example of FIG. 13, the example interface 1200, via the second area, identifies camera identification data including name data, status data, address data, serial data, model site visibility system data, and sensor data associated with the camera. The first section 1304 identifies the name of the camera as "10.9.19.21." The second section 1306 identifies the status of the camera as "Online," the address of the camera as "10.9.19.21," the serial number of the camera as "0002D195F30E," the model of the camera as "ACME 123," and the site visibility system of the camera as "Gateway 123." The third section 1308 identifies a subset of sensor data (e.g., an image frame associated with the camera).

In the example of FIG. 13, the example interface 1200, via the third area 1309, identifies uniform operations to cause the camera to perform a corresponding action. The third area 1309 includes multiple sections. A first section of the third area 1309 identifies uniform operations related to settings, a second section of the third area 1309 identifies uniform operations related to diagnostics, and a third section of the third area 1309 identifies uniform operations related to debugging. Though the second section and the third section are not shown with respect to FIG. 13, it will be understood that the second section and the third section may include any uniform parameters.

The third area 1309 identifies a magnitude operation 1310 that can cause an adjustment to a magnitude (e.g., relevancy) parameter identifying a magnitude of motion events (e.g., a 20% magnitude, a 30% magnitude, etc.). For example, the magnitude operation 1310 may cause an adjustment to how the camera, the management server system, a separate system, etc. identifies motion. In the example of FIG. 13, the third area 1309 indicates that the magnitude operation 1310 is set to adjust a magnitude parameter to "20%."

The third area 1309 includes an interactive parameter 1312 to enable a user to select a particular channel of a particular camera. Therefore, the parameters of one or more channels of the camera can be adjusted. In the example of FIG. 13, the camera includes a "Main Channel," a "Second Channel," and a "Third Channel."

The third area 1309 identifies a plurality of uniform operations to be selected and/or defined by a user (e.g., via an interaction with a user interface). The plurality of uniform operations includes a first operation 1314 to adjust an encoding parameter (e.g., H.264, H.265, etc.), a second operation 1316 to adjust a resolution parameter (e.g., 1080 pixels ("1080P"), 1920 pixels ("1920P"), etc.), a third operation 1318 to adjust a framerate parameter (e.g., 15 frames per second ("fps"), 20 fps, etc.), a fourth operation 1320 to adjust a target quality parameter (e.g., 100%, 90%, 75%, etc.), a fifth operation 1322 to adjust a max bitrate parameter (e.g., 1.0 megabits per second ("MBPS"), 2.0 MBPS, etc.), and a sixth operation 1324 to adjust a priority upon reaching a max bitrate parameter (e.g., framerate, image quality, etc.). It will be understood that the third area 1309 may identify more, less, or different operations. For example, the third area may include an operation to adjust a password parameter of the camera.

In the example of FIG. 13, the third area 1309 indicates that the first operation 1314 is adjusted to cause the encoding parameter to adjust to "H.264," the second operation 1316 is adjusted to cause the resolution parameter to adjust to "1080P," the third operation 1318 is adjusted to cause the framerate parameter to adjust to "15 Fps," the fourth operation 1320 is adjusted to cause the target quality parameter to adjust to "100%," the fifth operation 1322 is adjusted to cause the max bitrate to adjust to "1.0 Mbps," and the sixth operation 1324 is adjusted to cause the priority upon reaching a max bitrate parameter to adjust to "Framerate."

In some cases, the camera may be associated with recommended parameters and the third area 1309 may include an additional interactive parameter that can cause an operation to be performed to adjust one or more parameters to match the recommended parameters. In some cases, the interactive parameter can cause an operation to be performed to adjust one or more parameters across one or more channels (e.g., all or a portion of the parameters associated with a particular camera) to match the recommend parameters.

Example Embodiments of Managing Cameras

Figure 14:
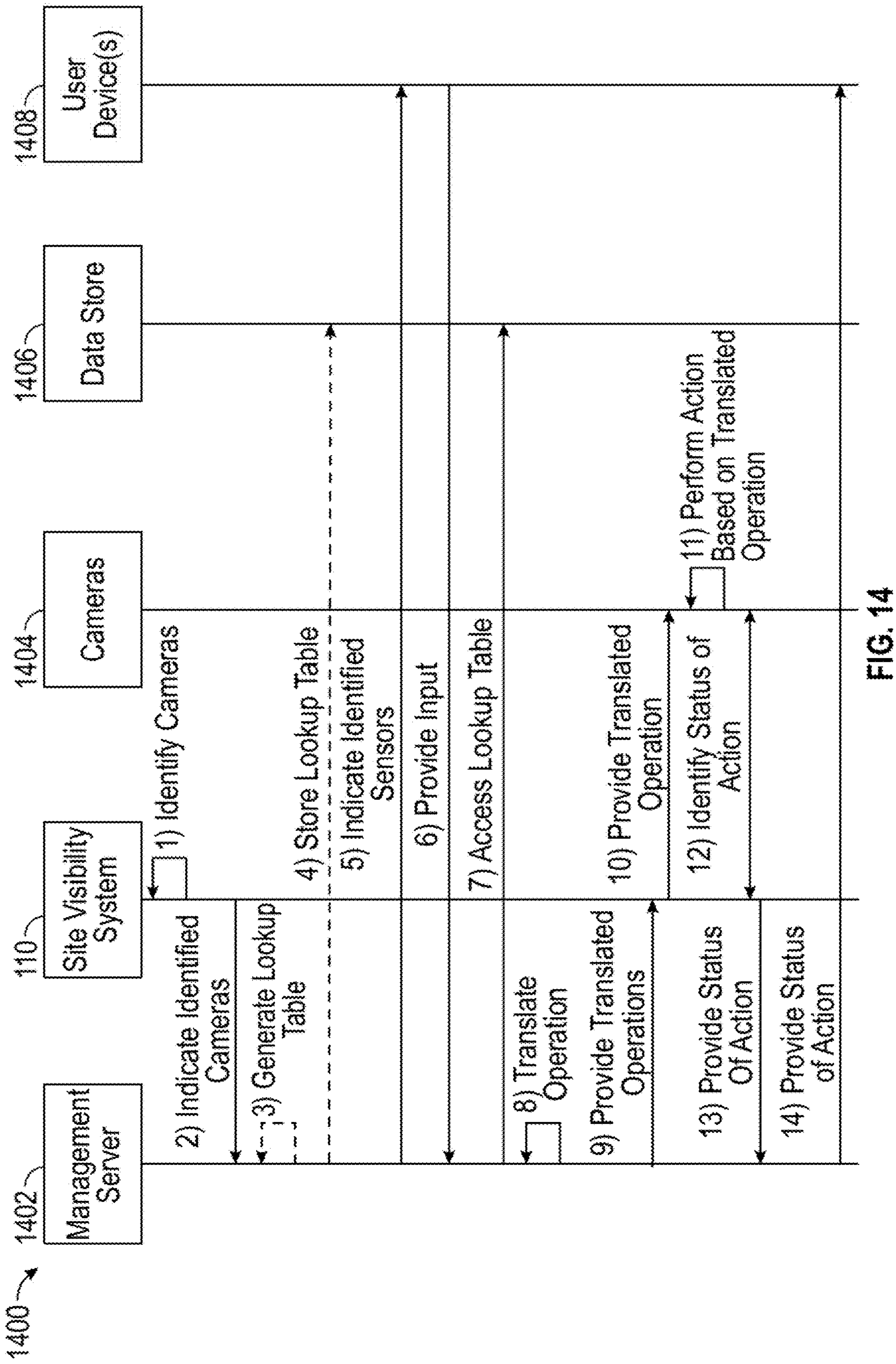
FIG. 14 is a flowchart illustrating one embodiment of an example translation of camera operations by a site visibility system.

FIG. 14 depicts interactions among various components for managing cameras in accordance with aspects of the present disclosure. The environment 1400 may include various components implemented in a networked configuration The environment 1400 may include a management server system 1402, a site visibility system (e.g., site visibility system(s)) 110, cameras (e.g., camera(s)) 1404, data store 1406, and user device(s) 1408. The management server system 1402 may include a system for managing the cameras 1404. The data store 1406 may include a cache, a data store, a database, virtual storage, etc. for storing a lookup table for access by the management server system 1402. It will be understood that the environment 1400 may include more, less, or different components.

As shown in FIG. 14, at [1], the site visibility system 110 identifies cameras 1404. The site visibility system 110 may identify the cameras 1404 based on the cameras 1404 being connected to the site visibility system 110 via a network connection. In some cases, the cameras 1404 may be registered with the site visibility system 110. Further, the site visibility system 110 may determine that a portion of the cameras 1404 are registered with the site visibility system 110 and have an active network connection with the site visibility system 110. For example, the site visibility system 110 may determine that a portion of the cameras 1404 have an active network connection by sending one or more test communications to the cameras 1404.

The cameras 1404 may identify (e.g., generate) sensor data and provide the sensor data to the site visibility system 110. The cameras 1404 may include a plurality of cameras associated with an environment, a physical asset (e.g., a vehicle), etc. For example, the cameras 1404 may include one or more image sensors, one or more audio sensors, one or more video sensors, etc. disposed (e.g., within a physical asset, environment, etc.) to monitor data associated with a physical asset, environment, etc. The cameras 1404 may generate the sensor data over a period of time. In some embodiments, the site visibility system 110 may receive the sensor data via a wired or a wireless connection. For example, the site visibility system 110 may receive sensor data via one or more sensors that are integrated into the site visibility system 110 and/or via a network connection. Further, the site visibility system 110 may receive the sensor data as streaming data or as non-streaming data.

At [2], the site visibility system 110 indicates the identified cameras to the management server system 1402. For example, the site visibility system 110 may provide identified sensor data identifying the cameras 1404 to the management server system 1402. In some cases, the site visibility system 110 may periodically or aperiodically indicate the identified cameras to the management server system 1402. For example, the site visibility system 110 may indicate the identified cameras every 10 minutes, every 20 minutes, etc. In another example, the site visibility system 110 may indicate the identified cameras in response to identifying a previously offline camera is online, a previously online camera is offline, a new camera has been registered with the site visibility system 110, a camera has been deregistered with the site visibility system 110, etc.

At [3]. the management server system 1402 can generate a lookup table. The management server system 1402 can generate the lookup table based on communications with the site visibility system 110 and/or the cameras 1404. For example, the management server system 1402 can provide camera operations (translated operations) to the site visibility system 110 and/or the cameras 1404 and determine a corresponding action performed by the cameras 1404 in response to the camera operations. Based on the corresponding action performed by the cameras 1404, the management server system 1402 can generate a lookup table by correlating (e.g., linking) the camera operation and a uniform operation corresponding to the performed action. For example, the management server system 1402 may determine a zoom action was performed in a particular location (e.g., a left corner of the image frame) at a particular level or strength (e.g., a 150% zoom) and link the provided camera operations (e.g., commands) to a uniform operation (e.g., indicating the zoom action at the particular level and at the particular location). In some embodiments, the management server system 1402 may provide the operation to the camera and receive sensor data from the camera in response to the operation. The management server system 1402 may provide the sensor data (and sensor data generated prior to providing the operation) to a machine learning model, trained on historical data, to identify an action performed by the camera (e.g., a brightness adjustment action). In some cases, the management server system 1402 may automatically provide the sensor data to the machine learning model to identify an action performed by the camera. The management server system 1402 may (e.g., automatically) adjust and/or generate the lookup table based on the identified action. In some cases, the management server system 1402 may not generate the lookup table and the management server system 1402 may obtain and/or identify the lookup table (e.g., obtain the lookup table from a user computing device).

At [4], the management server system 1402 can store the lookup table. For example, the management server system 1402 can store the lookup table in a data store 1406. In some cases, the management server system 1402 can update (e.g., periodically) a lookup table stored in the data store 1406.

At [5], the management server system 1402 indicates the identified cameras to the user device(s) 1408. For example, the management server system 1402 may provide the identified sensor data identifying the cameras 1404 to the user device(s) 1408. In some cases, the management server system 1402 may periodically or aperiodically indicate the identified cameras to the user device(s) 1408. To indicate the identified cameras, the management server system 1402 may cause display of a user interface via one or more displays of the user device(s) 1408. For example, the user interface may identify all or a portion of the cameras 1404.

In some cases, the management server system 1402 may indicate one or more uniform operations that can cause the cameras 1404 to perform corresponding actions. For example, the management server system 1402 can identify uniform operations including a zoom operation, a brightness adjustment operation, a contrast adjustment operation, a password adjustment operation, etc. In some embodiments, the user interface may identify all or a portion of the uniform operations compatible with a particular camera.

At [6], the user device(s) 1408 provide input to the management server system 1402. The input can include a selection of a particular camera and/or a particular uniform operation. For example, a user may interact with a user interface of the user device(s) 1408 to select a particular camera (e.g., camera 123) and a particular uniform operation (e.g., an operation to adjust the contrast of sensor data to a +2).

At [7], the management server system 1402 accesses the lookup table. The management server system 1402 can access the lookup table in response to the input provided by the user device(s) 1408. The management server system 1402 may access the lookup table by obtaining the lookup table from the data store 1406.

At [8], the management server system 1402 translates the operation. The management server system 1402 can translate the operation to generate a translated operation. Further, the management server system 1402 may translate the uniform operation identified by the input. The management server system 1402 may translate the uniform operation based on the lookup table and the camera identified by the input. For example, the lookup table may identify a manner of translating the operation to generate a camera operation (e.g., a translated operation) performable by the camera. In some embodiments, the management server system 1402 may utilize the lookup table to identify the camera operation. In some cases, the management server system 1402 may not access a lookup table, instead, the management server system 1402 can access translation data identifying the manner of translating a particular uniform operation for a particular camera and/or identifying the translated operation for the particular uniform operation and the particular camera. Therefore, the management server system 1402 can generate the translated operation.

At [9], the management server system 1402 provides the translated operation to the site visibility system 110. Further, the management server system 1402 may provide the translated operation and an indication of a camera (e.g., the camera identified by the input) to which the site visibility system is to route the translated operation. In some cases, the management server system 1402 may provide instructions to the site visibility system 110 that cause the site visibility system 110 to route the translated operation to the camera.

At [10], the site visibility system 110 provides the translated operation to the camera of the cameras 1404. The site visibility system 110 may provide the translated operation and instructions causing the camera to execute the translated operation and perform a corresponding action.

The site visibility system 110 and/or the management server system 1402 may use a unified Application Programming Interface ("API") to communicate with (e.g., provide translated operations and/or receive responses) all or a portion of a plurality of cameras. The plurality of cameras may correspond to a plurality of camera types. Further, the site visibility system 110 and/or the management server system 1402 may utilize the same API to obtain inputs and provide different translated operations to different cameras (e.g., cameras having different camera types). The API of the site visibility system 110 and/or the management server system 1402 may provide API calls to individual APIs of the cameras (e.g., to provide translated operations and/or receive responses). Therefore, a single API may enable the site visibility system 110 and/or the management server system 1402 to communicate with each of a plurality of cameras.

At [11], the camera of the cameras 1404 performs the action based on the translated operation. For example, the camera may perform the action in response to obtaining the translated operation from the site visibility system 110.

At [12], the site visibility system 110 identifies a status of the action (e.g., a status of the performance of the action). The site visibility system 110 may identify the status of the action based on monitoring the camera. For example, the site visibility system 110 may monitor the camera, sensor data generated by the camera, etc. to identify a status of the action. In some cases, the site visibility system 110 may monitor the camera utilizing one or more other sensors. For example, the site visibility system 110 may utilize sensor data from one or more other sensors to monitor the camera and identify a status of the action. The site visibility system 110 may identify a status of the action as performed, partially performed, not performed, etc. In some cases, the site visibility system 110 may identify an amount of the action performed (e.g., 50%, 75%, 100%, etc.).

At [13], the site visibility system 110 provides the status of the action to the management server system 1402. At [14], the management server system 1402 provides the status of the action to the user device(s) 1408. Further, the management server system 1402 may cause display of a user interface via a display of the user device(s) 1408 identifying the status of the action.

Example Method of Managing Cameras

Figure 15:
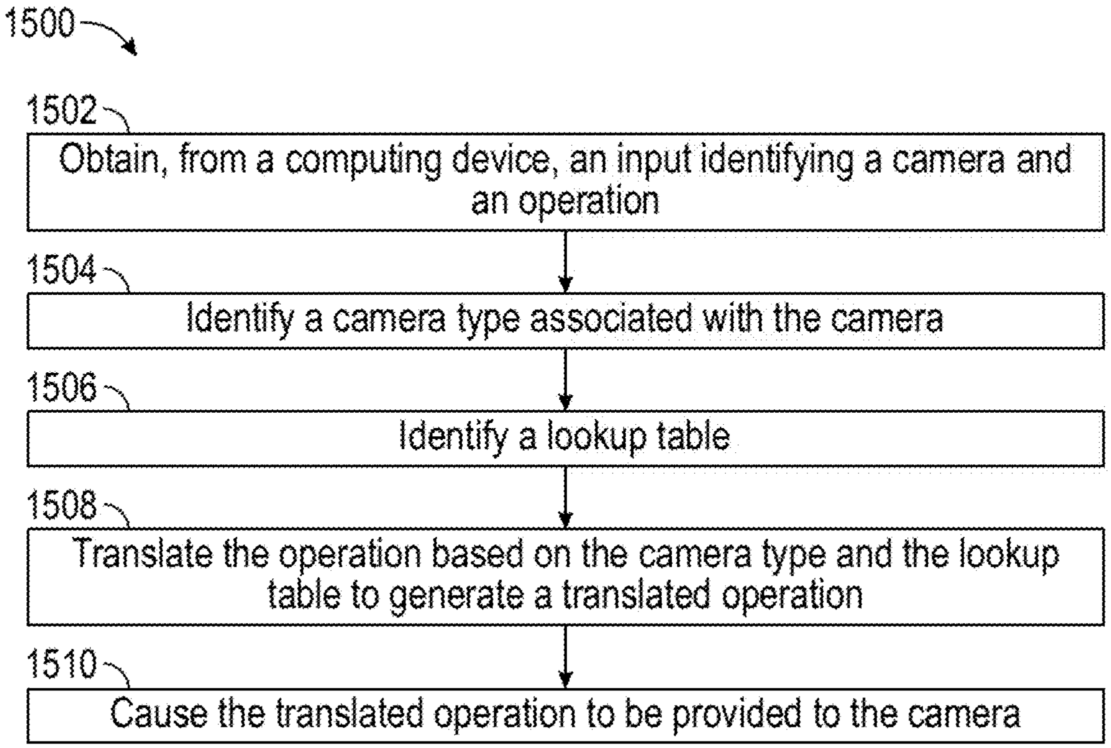
FIG. 15 illustrates an example method of translating camera operations by a site visibility system, according to various embodiments of the present disclosure.

FIG. 15 illustrates an example method 1500 of enabling user computing devices to provide uniform operations to a system generating translated operations for cameras, according to various embodiments described herein.

At block 1502, the management server system obtains, from a computing device, an input identifying a camera and an operation. In some cases, the input may identify a sensor (e.g., an image sensor). For example, the image sensor may be a lidar sensor, a radar sensor, etc. The management server system may further obtain instructions to cause the camera to perform an action corresponding to the operation (e.g., to adjust one or more parameters of the camera corresponding to the operation).

The management server system may obtain the input (e.g., user input) via a first user interface of a computing device. The first user interface may identify a plurality of cameras (e.g., cameras associated with a plurality of sets of camera identification data) and a plurality of operations (e.g., generic, uniform, etc. operations) for selection by a user. For example, all or a portion of the plurality of cameras may be associated with different camera types. The plurality of operations may include a bit rate adjustment, a frame rate adjustment, a resolution adjustment, a password adjustment, a zoom operation, a flip operation, a rotate operation, a mirror operation, a brightness operation, a contrast operation, a saturation operation, a sharpness operation, and/or an internet protocol settings adjustment.

The operation may include one or more sub-operations (e.g., a first sub-operation, second sub-operation, etc.). The management server system may combine the sub-operations to generate the operation. In some embodiments, prior to combining the sub-operations, the management server system may determine the sub-operations are combinable. If the management server system determines the sub-operations are combinable, the management server system may combine the sub-operations. If the management server system determines the sub-operations are not combinable, the management server system may not combine the sub-operations and may indicate that the sub-operations are not combinable, via the user interface.

At block 1504, the management server system identifies a camera type associated with the camera. Further, the management server system may identify a set of camera identification data identifying the camera type of the camera. The camera type of the camera may include a camera model, a camera manufacturer, a camera interface, a camera code language, a camera brand, an update status, camera software, camera hardware, camera capabilities, etc. The camera type may be based on a camera protocol of the camera (e.g., an ONVIF camera protocol, an Axis camera protocol, etc.).

At block 1506, the management server system identifies a lookup table. In some cases, the lookup table may be a translation table. The lookup table may link a plurality of operations, a plurality of sets of camera identification data, and at least one of a manner of translating operations or a plurality of translated operations corresponding to all or a portion of the plurality of operations for performance by all or a portion of the plurality of sets of camera identification data. The translated operations may identify camera operations associated with (e.g., executable by) a particular camera. Further, the management server system may identify commands that cause the camera to execute the translated operation.

All or a portion of the manners of translating the operations and the translated operations may cause performance of different actions. For example, a manner of translating the operation for the set of camera identification data may cause generation of a translated operation and a second manner of translating the operation for a second set of camera identification data may cause generation of a second translated operation. The translated operation and the second translated operation may cause the camera to perform different actions and/or the translated operation may cause the camera to perform an action and the second translated operation may cause a camera associated with the second set of camera identification data to perform the same action.

In some cases, the management server system may identify, via the lookup table, and/or determine a manner of translating each of the plurality of operations for each of a plurality of sets of camera identification data (e.g., a plurality of camera types).

In some embodiments, the user may provide, via the first user interface, input identifying a manner of translating the operation to generate a translated operation. For example, the user may provide one or more commands, instructions, etc. associated with the camera. In some embodiments, the management server system may build the lookup table based on determining that that the operation corresponds to a translated operation. The management server system may identify the manner of translating the operation to generate the translated operation and may link the translated operation to the operation in the lookup table (e.g., based on the manner of translating the operation).

In other embodiments, the management server system may determine the manner of translating the operation by identifying a test operation (e.g., a test operation that may be associated with the operation). The management server system may provide the test operation to the camera to cause the camera to perform an action corresponding to the test operation. In response to providing the test operation to the camera, the management server system may obtain, from the camera, feedback (e.g., sensor data including one or more images) and identify the manner of translating the operation based on the feedback. For example, the management server system may determine if the test operation caused the camera to perform the action. If the test operation did cause the camera to perform the action, the management server system may link the test operation to the operation and if the test operation did not cause the camera to perform the action, the management server system may not link the test operation to the operation.

To determine if the test operation caused the camera to perform the action, the management server system may analyze sensor data of the feedback. For example, the management server system may compare a first image of sensor data generated prior to performance of the action to a second image of the sensor data generated in response to and/or subsequent to the performance of the action. The management server system may compare the images by providing the images to a machine learning model (e.g., a neural network). The machine learning model may be trained on historical data to identify an action performed by a camera (or other sensor) subsequent to generation of a first set of sensor data and prior to generation of a second set of sensor data. If the management server system determines the additional action corresponds to the action based on analyzing the one or more images, the management server system may link the test operation to the operation and if the management server system determines the additional action does not correspond to the action based on analyzing the one or more images, the management server system may not link the test operation to the operation.

At block 1508, the management server system translates the operation based on the camera type and the lookup table to generate a translated operation. For example, the management server system may utilize an identified manner of translating the operation from the lookup table to translate the operation based on the lookup table linking the manner of translating the operation to the set of camera identification data. In some cases, the operation may be translated into a plurality of translated operations and all or a portion of the plurality of translated operations may cause a different camera associated with the particular translated operation to perform the action.

At block 1510, the management server system causes the translated operation to be provided to the camera. For example, the management server system may provide the translated operation to a site visibility system and may cause the site visibility system to provide the translated operation to the camera. Providing the translated operation to the camera may cause the camera to perform the action and providing a different translated operation (e.g., the second translated operation) may not cause the camera to perform the action. In some cases, if the translated operation corresponds to a plurality of sub-operations, providing the translated operation may cause the camera to perform a plurality of corresponding sub-actions, each corresponding to a particular sub-operation.

In some cases, the management server system may obtain, from the camera, a response indicating a status of the performance of the action. For example, the management server system may obtain the response via the site visibility system. In some cases, the response may include feedback (e.g., sensor data) from the camera. To determine the response, the management server system may analyze sensor data of the feedback. The management server system may analyze the sensor data using machine learning techniques and/or artificial intelligence. As discussed above, the management server system may compare a first image of sensor data generated prior to performance of the action to a second image of the sensor data generated in response to and/or subsequent to the performance of the action. The management server system may compare the images by providing the images to a machine learning model (e.g., a neural network). The machine learning model may be trained on historical data to identify an action performed by a camera (or other sensor) subsequent to generation of a first set of sensor data and prior to generation of a second set of sensor data. Therefore, the machine learning model may output an action performed by the camera. The management server system may analyze the output of the machine learning model to determine if a particular action has been performed and/or implemented correctly.

In some cases, the management server system may cause display of response data identifying the status of the performance of the action. For example, the management server system may cause display of the response data via a second user interface of the computing device. If the management server system determines that the action has been performed and/or implemented correctly, the management server system may cause display of response data indicating the successful performance of the action. If the management server system determines that the action has not been performed and/or implemented correctly, the management server system may cause display of response data indicating the unsuccessful performance of the action. Further, the management server system may (e.g., automatically) identify a second translated action and (e.g., automatically) provide the second translated action to cause performance of the action. The management server system may further analyze feedback received in response to providing the second translated action to determine if the action has been performed and/or implemented correctly. The management server system may continue to identify and provide translated operations until the management server system determines the action has been performed and/or implemented correctly.

In some embodiments, the management server system may obtain a second input identifying a second camera and the operation. Based on obtaining the second input, the management server system may identify a second set of camera identification data (e.g., a camera type) associated with the second camera. Further, the management server system may translate the operation based on the second set of camera identification data and the lookup table to generate a second translated operation (e.g., different from the translated operation). For example, the management server system may utilize a second manner of translating the operation, based on the lookup table, to generate the second translated operation. The management server system may provide the second translated operation to the second camera to cause the second camera to perform the action.

In some embodiments, the management server system may automatically translate operations. For example, the management server system may determine an additional operation associated with the camera without obtaining additional input corresponding to the additional operation from a user computing device. The management server system may translate the additional operation based on the camera identification data and the lookup table to generate an additional translated operation. The management server system may cause the translated operation to be automatically provided to the camera which may cause the camera to automatically perform an additional action corresponding to the additional translated operation.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others. While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A management server system comprising:

a computer readable storage medium having program instructions embodied therewith; and one or more processors configured to execute the program instructions to:

obtain, via a first user interface of a computing device, a user input, the user input identifying a camera and an operation associated with the camera;

identify a first set of camera identification data associated with the camera, wherein the first set of camera identification data identifies a camera model of the camera and a manufacturer of the camera;

identify a translation table, wherein the translation table maps a plurality of operations, a plurality of sets of camera identification data, and a manner of translating each of the plurality of operations for each of the plurality of sets of camera identification data, wherein a first manner of translating the operation for the first set of camera identification data causes generation of a first translated operation and a second manner of translating the operation for a second set of camera identification data causes generation of a second translated operation;

translate the operation utilizing the first manner of translating the operation based on the translation table linking the first manner of translating the operation to the first set of camera identification data;

provide the first translated operation to a site visibility system associated with the camera, wherein the site visibility system provides the first translated operation to the camera, wherein providing the first translated operation to the camera causes performance of an action and providing the second translated operation to the camera does not cause the performance of the action;

obtain, from the camera, via the site visibility system, a response, wherein the response indicates a status of the performance of the action; and cause display, via a second user interface of the computing device, of response data identifying the status of the performance of the action.

2. A management server system comprising:

a computer readable storage medium having program instructions embodied therewith; and one or more processors configured to execute the program instructions to:

determine, based on a plurality of inputs from a plurality of cameras, that a camera-generic operation and a respective camera-specific operation for each respective camera of the plurality of cameras correspond to a same action;

obtain, from a computing device, an input, the input identifying a camera of the plurality of cameras and the camera-generic operation;

identify a camera type of the camera;

identify a translation table, wherein the translation table associates the camera-generic operation and a camera-specific operation for cameras having the camera type based on determining that the camera-generic operation and the camera-specific operation correspond to the same action;

translate the camera-generic operation based on the camera type and the translation table to generate the camera-specific operation; and provide the camera-specific operation to the camera, wherein providing the camera-specific operation to the camera causes the camera to perform an action corresponding to the camera-specific operation.

3. The management server system of claim 2, wherein the translation table links a plurality of camera-generic operations, a plurality of camera types, and a manner of translating each of the plurality of camera-generic operations for each of the plurality of camera types, wherein the one or more processors are further configured to execute the program instructions to translate the camera-generic operation further utilizing a particular manner of translating the camera-generic operation based on the translation table linking the particular manner of translating the camera-generic operation to the camera type.

4. The management server system of claim 2, wherein the one or more processors are further configured to execute the program instructions to:

obtain, from the computing device, a second input, the second input identifying a second camera and the camera-generic operation;

identify a second camera type of the second camera;

translate the camera-generic operation based on the second camera type and the translation table to generate a second camera-specific operation; and provide the second camera-specific operation to the second camera.

5. The management server system of claim 2, wherein the one or more processors are further configured to execute the program instructions to identify a manufacturer of the camera based on the camera type of the camera, wherein the one or more processors are further configured to translate the camera-generic operation further based on the manufacturer of the camera.

6. The management server system of claim 2, wherein the camera type is based on a camera protocol of the camera.

7. The management server system of claim 6, wherein the camera protocol is based on an ONVIF camera protocol or an Axis camera protocol.

8. The management server system of claim 2, wherein the one or more processors are further configured to execute the program instructions to:

obtain, from the camera, a response, wherein the response indicates a status of performance of the action; and cause display, via a user interface of the computing device, of response data identifying the status of the performance of the action.

9. The management server system of claim 2, wherein the one or more processors are further configured to execute the program instructions to cause display, via the computing device, of a user interface identifying the plurality of cameras and a plurality of camera-generic operations, wherein the input comprises user input obtained via the user interface.

10. The management server system of claim 2, wherein the one or more processors are further configured to execute the program instructions to determine, for each of a plurality of camera types, a manner of translating each of a plurality of camera-generic operations.

11. The management server system of claim 2, wherein the one or more processors are further configured to execute the program instructions to obtain, via a user interface, additional input identifying a particular manner of translating the camera-generic operation to generate the camera-specific operation.

12. The management server system of claim 2, wherein the one or more processors are further configured to execute the program instructions to:
- identify a test operation associated with the camera-generic operation;
- provide the test operation to the camera, wherein providing the test operation to the camera causes the camera to perform an additional action corresponding to the test operation;
- obtain, from the camera, feedback corresponding to the additional action; and
- identify a particular manner of translating the camera-generic operation to generate the camera-specific operation based on the feedback.

13. The management server system of claim 2, wherein the one or more processors are further configured to execute the program instructions to:
- compare a first image corresponding to a time period prior to performance of an additional action to a second image corresponding to a time period subsequent to the performance of the additional action;
- determine the additional action corresponds to the action based on comparing the first image to the second image; and
- identify a particular manner of translating the camera-generic operation to generate the camera-specific operation based on determining the additional action corresponds to the action.

14. The management server system of claim 2, wherein the camera-generic operation comprises a first sub-operation and a second sub-operation, wherein the one or more processors are further configured to execute the program instructions to combine the first sub-operation and the second sub-operation to generate the camera-generic operation, wherein performance of the action comprises performance of a first sub-action corresponding to the first sub-operation and performance of a second sub-action corresponding to the second sub-operation.

15. The management server system of claim 2, wherein the one or more processors are further configured to execute the program instructions to:
- identify a first sub-operation and a second sub-operation;
- determine the first sub-operation and the second sub-operation are combinable; and
- combine the first sub-operation and the second sub-operation to generate the camera-generic operation based on determining the first sub-operation and the second sub-operation are combinable.

16. The management server system of claim 2, wherein the camera-generic operation comprises at least one of a bit rate adjustment, a frame rate adjustment, a resolution adjustment, a password adjustment, a zoom operation, a flip operation, a rotate operation, a mirror operation, a brightness operation, a contrast operation, a saturation operation, a sharpness operation, or an internet protocol settings adjustment.

17. The management server system of claim 2, wherein the camera-generic operation corresponds to a plurality of camera-specific operations associated with the plurality of cameras, wherein each camera-specific operation of the plurality of camera-specific operations causes a respective camera associated to perform the action.

18. The management server system of claim 2, wherein the one or more processors are further configured to execute the program instructions to:
- determine the camera-generic operation corresponds to the camera-specific operation;
- identify a manner of translating the camera-generic operation to generate the camera-specific operation; and
- link the camera-specific operation to the camera-generic operation within the translation table based on the manner of translating the camera-generic operation, wherein the one or more processors are further configured to execute the program instructions to translate the camera-generic operation based on linking the camera-specific operation to the camera-generic operation.

19. The management server system of claim 2, wherein the one or more processors are further configured to execute the program instructions to:
- determine an additional camera-generic operation without obtaining additional input corresponding to the additional camera-generic operation from the computing device;
- translate the additional camera-generic operation based on the camera type and the translation table to generate an additional camera-specific operation; and
- automatically provide the additional camera-specific operation to the camera, wherein providing the additional camera-specific operation to the camera causes the camera to automatically perform an additional action corresponding to the additional camera-specific operation.

20. A computer-implemented method comprising:
- determining, based on a plurality of inputs from a plurality of image sensors, that an image sensor-generic operation and a respective image sensor-specific operation for each respective image sensor of the plurality of image sensors correspond to a same action;
- obtaining, from a computing device, an input, the input identifying an image sensor of the plurality of image sensors and the image sensor-generic operation;
- identifying an image sensor type associated with the image sensor;
- identifying a lookup table, wherein the lookup table associates the image sensor-generic operation and an image sensor-specific operation for image sensors having the image sensor type based on determining that the image sensor-generic operation and the image sensor-specific operation correspond to the same action;
- translating the image sensor-generic operation based on the image sensor type and the lookup table to generate the image sensor-specific operation; and
- causing the image sensor-specific operation to be provided to the image sensor, wherein providing the image sensor-specific operation to the image sensor causes the image sensor to perform an action corresponding to the image sensor-specific operation.

* * * * *